United States Patent [19]

Horvath

[11] Patent Number: 4,490,349

[45] Date of Patent: Dec. 25, 1984

[54] HYDROGEN PRODUCTION

[75] Inventor: Stephen Horvath, St. Ives, Australia

[73] Assignee: Beeston Company Limited, Hong Kong, Hong Kong

[21] Appl. No.: 293,801

[22] Filed: Aug. 17, 1981

[51] Int. Cl.³ .............................................. C01B 13/00
[52] U.S. Cl. ................................. 423/657; 422/222; 422/240; 422/241; 423/648 R
[58] Field of Search ................... 423/579, 648 R, 657; 422/202, 204, 220, 222, 240, 241

[56] References Cited

U.S. PATENT DOCUMENTS

| 3,928,550 | 12/1975 | Seitzer | 423/657 |
| 4,053,576 | 10/1977 | Fletcher | 423/579 |
| 4,310,503 | 1/1982 | Erickson | 423/657 |
| 4,332,775 | 6/1982 | Genequand et al. | 423/579 |
| 4,371,500 | 2/1983 | Papineau | 423/657 |

FOREIGN PATENT DOCUMENTS

| 2310308 | 1/1977 | Belgium | 423/579 |
| 565013 | 10/1958 | Canada | 423/376 |
| 579535 | 7/1959 | Canada | 423/648 R |
| 2438264 | 5/1975 | Fed. Rep. of Germany | 423/648 R |
| 2402622 | 5/1979 | France | 423/648 R |
| 2642 | 1/1970 | Japan | 423/648 R |
| 14404 | 5/1970 | Japan | 423/648 R |
| 9189 | 1/1979 | Japan | 423/579 |

Primary Examiner—Gary P. Straub
Assistant Examiner—Wayne A. Langel
Attorney, Agent, or Firm—Biebel, French & Nauman

[57] ABSTRACT

Method and apparatus for deriving hydrogen from superheated steam. Superheated steam is passed into chamber between opposing chamber walls. One of chamber walls is formed of a reactant such as iron which reacts exothermally with the superheated steam to liberate free hydrogen and to produce an oxidized compound such as ferric oxide. The other chamber wall is formed as a thin diffusion membrane permeable to hydrogen but relatively impermeable to steam and oxygen and hydrogen is extracted from the chamber by diffusion therethrough. The membrane is preferably made of palladium or a palladium-silver alloy to further decompose the superheated steam and enhance extraction of hydrogen. The reactant wall is heated at its side remote from the chamber in a reducing atmosphere to cause dissociation of the oxidized compound and removal of oxygen so as continuously to regenerate the reactant.

19 Claims, 14 Drawing Figures

RELATIVE ENTHALPY
Kcal/mole-equation

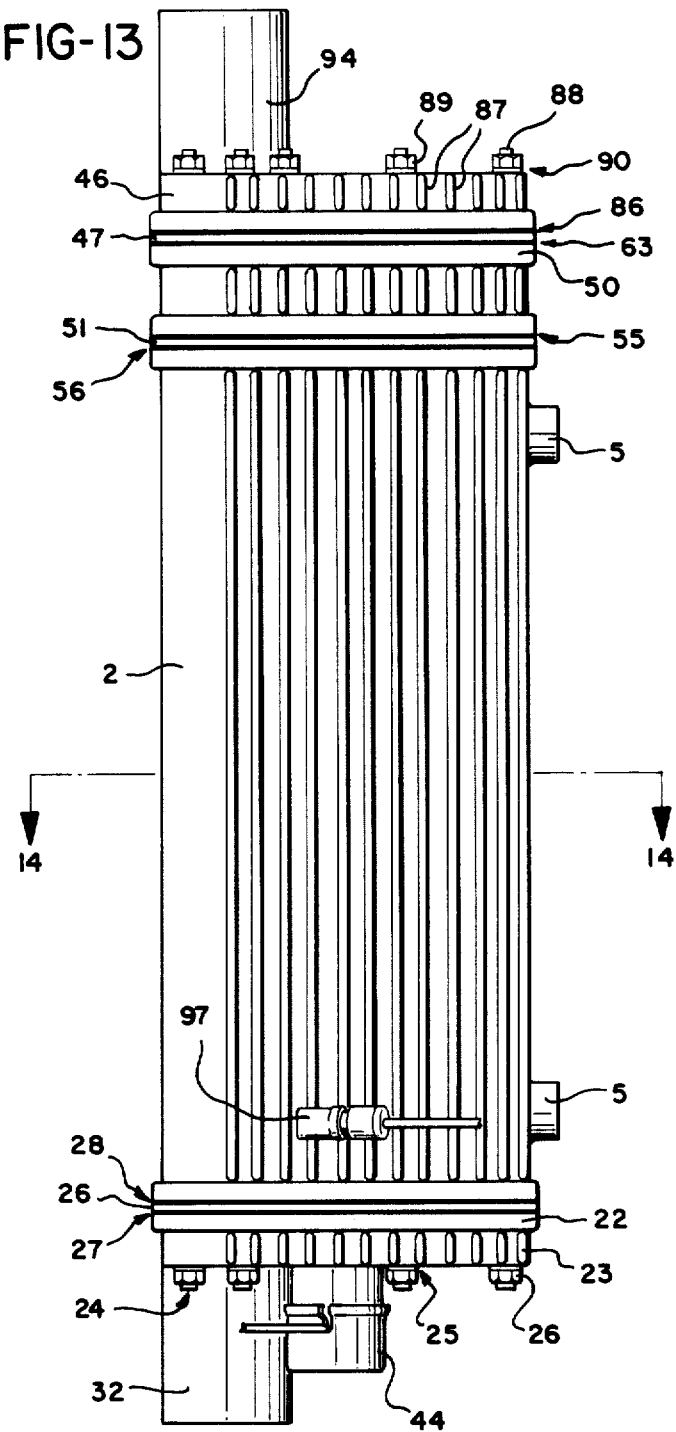

HYDROGEN PRODUCTION

BACKGROUND OF THE INVENTION

This invention relates to the generation of hydrogen, and more particularly this invention relates to a method and apparatus for catalytic hydrogenation and of the evolution of hydrogen.

The decade of the 1980's has become a critical period for mankind, energy consumption has continued to increase throughout the world as a result of the population explosion, accelerated industrialization, economic growth, and social development.

There is an increased public awareness of the social and environmental problems related to the production and consumption of fuels.

Efficiency in the production of energy, is one of the more critically important technical problems of the day. At the very time that the world's economy, and the economies of the industrialized countries are becoming increasingly dependent on the consumption of energy, there is a growing realization, that the main sources of this energy, the earth's non-renewable fossil fuel reserves, will inevitably be exhausted, and that in any event, the natural environment of the earth cannot readily assimilate the by-products of fossil fuel at much higher rates than it does at present without suffering unacceptable levels of pollution.

There is considerable agreement among scientists around the world, that hydrogen as fuel will emerge as the ultimate clean energy for the future. One of the raw materials out of which hydrogen is derived, and covers 71% of the total surface area of the earth, is water. Hydrogen is a non-pollutant fuel, and when burnt with air, it produces heat and steam, and as we all know, when it is condensed, water. This process is similar to the kind of recycling that nature provides, therefore, it works in harmony with nature, not in opposition to it.

There are many known methods to produce hydrogen, unfortunately they are expensive. Another problem standing in the way of hydrogen as a fuel, is the difficulty to store it, whether on board a vehicle or in a suitable stationary application, either as a compressed gas, or as a cryogenic liquid. Storage of hydrogen as a hydride appears promising, but it has an inherent high weight penalty associated with it.

It follows, that more efficient energy conversion processes and equipment must be provided, also, at any cost an alternate fuel supply for all of planet earth must be developed; one that will not deplete our natural resources in the manner of today.

It is known that the palladium/hydrogen system has been perhaps the most extensively experimentally investigated metal/gas system. It represents a general problem in inorganic binary systems concerning departures of the composition of the solid phase from simple stoichiometric ratios dependent on temperature and the equilibrium pressure of the gaseous component.

The system has further specific interest in that even with high contents of hydrogen, the solid phase retains considerable mechanical robustness in addition to its retention of metallic appearance and the considerable electrical conductivity also broadly characteristic of other hydrides of the transition elements. From an academic standpoint, interest in the system has perhaps centred primarily around attempts to provide theoretical explanations both of the form in which the hydrogen is contained in the solid and of the form of the pressure composition relationships.

Combinations of practical and theoretical interests have arisen from the applications of palladium and certain palladium alloys as hydrogen diffusion membranes, which also partly stems from a rather unique resistance to disruption and serious embrittlement even after absorbing large concentrations of hydrogen. These features of the system can, furthermore, also prove of practical advantage in the role of palladium (as well as of allied elements; for example, of the platinum group) in the fields of catalytic hydrogenation and of the evolution of hydrogen.

Using permeable palladium membranes for hydrogen production from one of the earth's most abundant resources, water, in a process now under study, by Johnson Space Center Code AT3, Houston, Tex. 77058, U.S.A. whereby superheated steam is fed into a long tunnel made of a permeable membrane. This input superheated steam consists of a natural balance, or equilibrium, between water vapour and a small percentage of free hydrogen and oxygen. As the steam moves along the tunnel, the initial free hydrogen escapes through the membrane, and the water vapour and the oxygen remain inside the tunnel. This upsets the natural water-/oxygen/hydrogen equilibrium in the steam, and results in the decomposition of some of the water molecules into more hydrogen and oxygen. Some of this hydrogen is removed thereby causing further decomposition of water molecules to provide more hydrogen for subsequent removal. Thus, as the gaseous mixture passes through the tunnel, hydrogen will be continuously formed and removed.

In the past, attempts had been made to remove free hydrogen from water using selectively permeable membranes. The productivity of these methods was limited to the recovery of the small amounts of free hydrogen naturally present in the water vapour. The features of this new process are:

a. The flowing vapour is contained within the membrane, under conditions favouring decomposition, for a long period of time.
b. This extended period of time allows the water (oxygen/hydrogen) system to produce hydrogen through the decomposition of water.
c. The process continues, and new hydrogen is produced as long as the gaseous mixture is in the tunnel.

However, even this new process or method of producing hydrogen needs to be improved by increasing its production efficiency, which in turn will improve its economic potential.

Before proceeding with the detailed description of the method and apparatus of the present invention, a detailed discussion of the principles upon which known methods of producing hydrogen from water or steam in addition to the process described above is in order.

At ordinary temperatures hydrogen can be displaced from water by the action of highly electropositive metals, or by electrolysis. Hydrogen can also be produced by the reaction of the hydrides of highly electropositive metals such as LiH, and $CaH_2$, using water at ordinary temperatures.

At higher temperatures, hydrogen may be displaced from water by a few of the less electropositive metals, and some of the non-metals. Although some of these reactions are convenient for laboratory use, only one or two have been used commercially on a large scale.

The metals which can be used at higher temperatures, i.e. magnesium, manganese, zinc and iron, do not displace hydrogen from water at room temperature, but do so if the metals are heated and the water is in the form of steam. The reaction of these metals with steam at high temperature produces hydrogen gas and the oxide rather than the hydroxide of the metal.

For example, when steam is passed over heated magnesium, the magnesium burns brightly producing solid magnesium oxide and hydrogen gas:

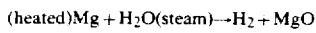
$$(heated)Mg + H_2O(steam) \rightarrow H_2 + MgO$$

and, $\Delta H = -86.0$ K cal/mole equation. Zinc, iron, and manganese also react with steam when heated, though less readily than magnesium, yielding hydrogen gas and zinc oxide, iron oxide, and manganese oxide respectively.

All of the above reaction are exothermic, so that once they are started they generally give off enough heat to maintain or supplement to great extent the high temperatures required for the reaction to maintain itself at the required rate.

Certain non-metals, such as carbon, can also displace hydrogen from water at high temperature, producing an oxide of the non-metal and hydrogen gas:

$$(heated)C + H_2O(steam) \rightarrow H_2 + CO$$

and, $\Delta H = +31.4$ K cal/mole equation this reaction is endothermic, so it is necessary to supply heat to maintain the reaction.

The Bosch Process:

Steam is passed over incandescent coke, at about 1,000° C. to produce a mixture of hydrogen and carbon monoxide called water gas. This is an endothermic reaction and a continuing supply of coke is consumed to maintain the temperatures essential to the reaction.

The hot carbon acts as a reducing agent and removes the oxygen from the steam. Since heat is absorbed in the reaction, the temperature of the coke drops as the reaction proceeds, and consequently the reaction slows down and would eventually stop. The coke therefore, must be reheated if continuous formation of water gas is required.

In actual practice, this is accomplished by alternating the endothermic stage, the production of water gas, with the exothermic stage of reheating the coke. During the reheating of the coke it is being continuously consumed, and of course the residue must be removed and replaced with fresh coke and heated. Adequate heat is evolved in the burning of the coke to raise the temperature to a red incandescent heat, which can then react further with the steam to produce the mixture of hydrogen and carbon monoxide.

A variation of the Bosch Process uses petroleum hydrocarbons instead of coke. Reforming reactions between hydrocarbons and steam in the presence of suitable catalysts at high temperatures (1,100° C.) produce a mixture of $H_2$ and CO. The hydrocarbon methane reacts with steam:

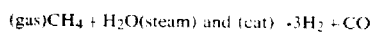
$$(gas)CH_4 + H_2O(steam) \text{ and (heat)} \rightarrow 3H_2 + CO$$

and $\Delta H = +49.3$ K cal/mol equation. This mixture of $H_2$ gas and CO gas may be used as a fuel. However, if hydrogen is the desired product, then the two gases must be separated by further reacting the carbon monoxide gas with additional steam at a lower temperature (500° C.), in the presence of a catalyst to produce more hydrogen gas and carbon dioxide gas. These two can be separated by passing the mixture through cold water under high pressure. The carbon dioxide gas dissolves, and the hydrogen gas is collected over the water.

Each and every one of the known methods of producing hydrogen, or a fuel gas which contains hydrogen, share a common fault or weakness. Each and every one of these methods require a second consumable, other than water, in order to produce hydrogen. The practicality and availability of this second consumable is always prohibitive for commerical acceptance, due to the ever increasing cost of raw materials used for this type of energy production.

Additionally, the methods which could possibly be operated on a large scale are all cyclic in nature, therefore, they cannot be operated continuously, which makes them ineffective as a system to produce hydrogen on board a vehicle, as well as in any other application where $H_2$ is required in a continuous manner.

Accordingly, it is the object of the present invention to provide a method of producing hydrogen from water which is in the form of steam by catalytic reaction.

It is another object of the present invention to provide a method for producing hydrogen from steam wherein the only consumable is water.

It is still another object of the present invention to provide a method for the production of hydrogen from steam which is highly efficient.

It is yet another object of the present invention to provide a method for generating hydrogen from steam in a continuous manner.

It is still another object of the present invention to provide an apparatus for generating hydrogen from steam.

It is yet another object of the present invention to provide a method and apparatus for generating hydrogen from steam, using permeable diffusion membranes, which assists the decomposition of steam and provide a means to displace hydrogen in a continuous manner, as well as using an additional metal catalyst capable of absorbing oxygen, therefore producing hydrogen, and capable of releasing oxygen at a predetermined dissociation temperature.

It is still a further object of the present invention to provide an apparatus for generating hydrogen from steam on board a vehicle as well as, in any stationary application where hydrogen is required on demand.

Because the present invention is so involved with the basic Laws of Science, they will be referred to individually as they become relevant. When appropriate or meaningful, I will not only specify the thermodynamic law involved, but I will insert equations as related to the discussion of the moment.

It is known that there are many kinds of energy, such as heat energy, radiation, mechanical, electrical, and magnetic energy, and so on.

Furthermore, from the Law of Conservation of Energy, it is known that the type of physical and chemical processes discussed in relation to the invention agrees, that in a chemical change there is no loss or gain but merely a transformation of energy from one form to another. The Conservation of Energy Law states, that "energy can neither be created nor destroyed" and therefore the total amount of energy in the universe remains constant.

This statement does not contradict the principle of the invention, because the law merely implies that whenever heat is actually converted to another form of energy, an equivalent amount of the other form appears.

When reference is given to a thermodynamic system, I intend that, it comprise any substance or substances under consideration. For example, 1 mole of a given gas under specified conditions of volume, pressure, and temperature can be considered a system. A given quantity of water at a given temperature and pressure may be a system, and so may a known quantity of solid iron together with a known quantity of oxygen gas at a given temperature and pressure.

The surroundings consist of everything outside the system. Specifically, the environmental surrounding, which is somehow effected by the change occurring in the system. A closed system does not exchange matter with its surroundings, but may exchange energy in some form—heat for example.

An isolated system exchanges neither matter nor energy with its surroundings.

When reference is given to a system as being in a given state, the system is fully characterized, and all relevant conditions are specified. For example, if the system is an ideal gas, its state is determined by any three of the following four properties:

Temperature—T
Pressure—P
Volume—V
Number of Moles—N

One can say any three because the fourth property may be derived from the ideal gas law, $PV = nRT$, or from the Van der Waals equation, $(P + a/V^2)(V - b) = RT$ for one mole of gas.

For a system composed of a specified number of moles of a pure liquid or a pure solid, the temperature and pressure are sufficient to completely describe the state of a stable system i.e., at equilibrium. Therefore, if one considers 1 mole of liquid water at 20° C. and under total pressure of 1 ATM, we can find from tables of physical constants that the density is 1.0 G/CM$^3$, and consequently we know that 1 mole (18.06 G) of liquid H$_2$O occupies a volume of 18.0 CM$^3$.

For solids, there is the possibility that different crystalline modifications may exist indefinitely, even though only one form is stable. In this case the crystalline form must be specified.

Finally, when the system is a mixture of two or more substances in equilibrium, along with temperature and pressure, the quantity of each substance present will be specified.

To summarise; the state of a thermodynamic system in the following description will be indentifiable by specifying:
1. All the substances composing the system.
2. The quantity and physical state—Gas, liquid, solid and when appropriate, the crystalline form of each of these substances.
3. The temperature and pressure of the system.

Transformation of a system, indicates any process by which a system passes from a specified initial state to a specified final state. Any chemical reaction represents a transformation of a system; the initial state of the system comprises the reactants, and the final state comprises the products.

Enthalpy and its relation to the invention:

Enthalpy, or heat content, is a thermodynamic quantity. It is equal to the sum of the internal energy of a system plus the product of pressure-volume work done on the system.

thus $H = E + PV$ where
H = Enthalpy or heat content
E = Internal energy of the system
P = Pressure
V = Volume A transformation at a constant pressure P, in which no work is done except the pressure-volume work, is $w = -P\Delta V$. For such transformations, the first law, $\Delta E = Q + W$ can be written as:

$$\Delta E = Q - P\Delta V$$

where P = constant. Since P is always a positive quantity, the term $P\Delta V$ has a negative sign if the work is done by the surroundings on the system, and it has a positive sign if the work is done by the system on the surroundings. The energy crossing the system boundary under the influence of a temperature difference or gradient is a quantity of heat Q represents an amount of energy in transit between the system and its surroundings and is not a property of the system. The usual convention with respect to signs requires that numerical values of Q be taken as positive when heat is added to the system, and negative when heat leaves the system. This is then called the enthalpy change of the transformation, $\Delta H$. Therefore, for any transformation at constant pressure and involving only pressure-volume work, the first law is written as:

$$\Delta E = \Delta H - P\Delta V \text{ and } \Delta H = \Delta E + P\Delta V$$

The quantitative enthalpy relationships with which thermochemistry is concerned are based on the Law of Conservation of Energy, and are valid for any given chemical change under consideration, regardless of structural interpretation of the chemical change itself. Thermochemical data has been used, to assist in determining which are the more significant energy factors relating to our development and to check the validity of our extrapolations of them.

During a reaction, the temperature of the system may rise and fall, and so may the pressure, but these changes will not effect the values of $\Delta H$, which is the enthalpy change of the reaction when the final state of the system, the products, has returned to the temperature and pressure of the initial state of the system. It is noted then, the enthalpy of a system is a thermodynamic function (a function of state), so that the enthalpy of a system accompanying a reaction, $\Delta H = H_f - H_i$, is independant of any intermediate state or states.

When it is not relevant to the equation, the physical state, temperature, and pressure of each of the reactants and products of a thermochemical reaction will be expressed as standard state. Then, any enthalpy change involving substances in their standard states is called standard enthalpy change at the specified temperature, and is indicated as $\Delta H$.

The initial step in the solution of our problem in thermodynamics applied to this invention, once the problem is established is to translate it into the terminology of thermodynamic variables, so that the laws of thermodynamics may be imposed. Therefore, one must provide the terms used to describe the quantitative definiations of the enthalpy (heat) changes which accompany chemical reactions.

Enthalpy of Atomization ($\Delta H_{atomiz}$):

The enthalpy of atomization is the energy involved in the transformation of 1 mole of a substance into its gaseous atoms, at the same temperature and pressure. Energy is always required to transform any substances, solid, liquid, or gas, into its gaseous atoms, so that the enthalpy of atomization, $\Delta H_{atomiz}$, is always positive (heat is absorbed by the system).

Enthalpy of Dissociation ($\Delta H_{diss}$):

This term is used to indicate the energy involved in the dissociation of a gaseous covalent molecule into its individual gaseous atoms at the same temperature and pressure as the original molecule. For these elements which exist at 25° C. and 1 ATM as gaseous diatomic molecules, the enthalpy of dissociation is the same as the enthalpy of atomization given in published tables.

Enthalpy of Ionization ($\Delta H_{ioniz}$):

We know that energy must always be supplied to remove an electron from a gaseous atom to form its monopositive gaseous ion, and that an even larger quantity of energy must be supplied to remove one or more additional electrons from the monopositive gaseous ion. Therefore, the enthalpy change $\Delta H$, for the removal of an electron either a neutral atom or a positive ion, always has a positive value.

The $\Delta H$ of ionization of a gaseous atom to form a gaseous positive ion is called the ionization energy. Conversely, the enthalpy change involved in the process by which a gaseous atom takes on an electron to form a gaseous mononegative ion, is simply the electron affinity of the element.

Usually, the values of the ionization energies and electron affinities of elements are given for the process at 25° C. and 1 ATM even though such reactions do not occur in actual practice under these conditions.

Enthalpy of Fusion ($\Delta H_{fus}$)
Vapourisation ($\Delta H_{vap}$) and
Sublimation ($\Delta H_{subl}$)

These terms indicate the energy involved in transforming 1 mole of a solid to a liquid, of a liquid to its vapour, and of a solid to its vapour, respectively. Again, both the reactant and the product of the transformation are at the same temperature and pressure.

Energy is always required to transform a solid to its liquid or vapour, and a liquid to its vapour, at the same temperature. Consequently, $\Delta H_{fus}$, $\Delta H_{subl}$, and $\Delta H_{vap}$ are always positive.

If a certain quantity of heat energy is required to melt 1 mole of a solid, or to evaporate 1 mole of a liquid, this same quantity of heat will be liberated when the liquid solidifies or the gas liquefies. Therefore, the heat of solidification of a substance is equal to its heat of fusion, but with a minus sign, and similarly the heat of liquefaction of a gas is equal to its heat of vapourisation, but with a minus sign.

Standard Enthalpy of Formation ($\Delta H_{form}$):

The standard enthalpy of formation of a compound is defined as the heat involved in the reaction by which 1 mole of the compound is formed its elements, each element initially in its standard state, and at the same temperature as the compound formed. All elements in their standard states are conventionally as signed a heat of formation equal to zero. The standard enthalpies of formation, $\Delta H°_{form}$, of compounds are usually given at 25° C., therefore, we will follow this covention.

Normally, the $\Delta H°_{form}$ of a compound does not have the capacity to decompose into its elements, or is stable toward decomposition into its elements on the other hand, if $\Delta H°_{form}$ has an appreciably large positive value, the compound tends to decompose spontaneously into its elements at room temperature.

Variation of Enthalpy with Temperature:

The enthalpy, H of a system under constant pressure always increases with the temperature as shown by the following considerations. For any system which under goes a transformation at constant pressure and involves only pressure—volume work, we have the relationship: $\Delta E = \Delta H - P\Delta V$.

The internal energy of a system is directly proportional to its temperature, so that an increase in temperature means that $\Delta E$ is positive.

Since most systems expand when the temperature increases $P\Delta V$ is positive, we can conclude that an increase in temperature means an increase in the enthalpy of the system ($\Delta H$ is positive) that is, $H_f$ is greater than $H_i$.

The molar heat capacity of a substance at constant pressure, $C_p$, is that temperature of 1 mole of any specified substance. Therefore, for a system consisting of a pure substance, the value of $\Delta H$ is related to the heat capacity $C_p$ by the expression, $\Delta H = C_p \times \Delta T$ where $\Delta T = T_f - T_i$. In this expression $C_p$ is assumed to have a constant value within the considered range of temperature, $T_i - T_f$. Actually, the heat capacity at constant pressure $C_p$ is almost independant of temperature for solid and liquid substances, providing the range of temperature is not very wide. For gases it will vary appreciably. The value of $C_p$ is well known for many substances.

For all substances, the increase in enthalpy with increasing temperature follows a pattern similar to $H_2O$, although of course the values of the relative enthalpies of different substances at the same temperature may vary appreciably, especially since the melting and boiling points may differ by as much as 1,000 degrees or more for different substances.

Entropy of a System:

There exists a property called entropy S, which for systems in equilibrium states is an intrinsic property of the system, functionally related to the measurable coordinates which characterise the system. For reversible processes changes in this property may be calculated by the following equation $$dS = \frac{\delta Q_{rev}}{T}$$

where T is the absolute temperature of the system.

The entropy change of any system and its surrounding, considered together, resulting from any real process is positive and approaches a limiting value of zero for any process that approaches reversibility. (Second Law of Thermodynamics).

In the same way that the first Law of Thermodynamics cannot be formulated without the prior recognition of internal energy as a property, so also the second law can have no complete and quantitative expression without a prior assertion of the existence of entropy as a property.

The second law requires that the entropy of an isolated system must increase, or in the limit, where the system has reached an equilibrium state, remain constant. For a closed (but not isolated) system it requires that any entropy decrease in either the system or its surrounding be more than compensated by an entropy increase in the other part, or in the limit, where the process is reversible, that the total entropy of the system plus surroundings remain constant.

The fundamental thermodynamic properties that arise in connection with the first and second laws of thermodynamics are internal energy and entropy. These properties together with the two laws for which they are essential, apply to all types of systems. However, different types of systems are characterised by different sets of measurable co-ordinates or variables.

Since we know that any property of a system whose change during a reaction depends only on the initial and final states is a thermodynamic function, we can now define its entropy. The entropy and its change in any reaction at constant temperature T is:

$$\Delta S = \frac{Q_{rev}}{T}$$

Since T always has a positive value, $\Delta S$ is positive (S the entropy of the system increases) when the system absorbs heat from the surroundings (Q is positive) and vice-versa, the entropy S of the system decreases ($\Delta S$ is negative) when the system gives up heat to the surroundings (Q is negative). It follows from the above definition that the entropy S of a system is expressed in units of energy divided by degrees of absolute temperature.

Since thermodynamic calculations usually use the mole as the basis for quantity of substance, $\Delta S$ is expressed in units of $CAL/MOL \times DEG. K$.

This unit is called the entropy unit (E.U.) to put our symbolic expression as $$\Delta S = \frac{Q_{rev}}{T}$$

into words, for any transformation at constant temperature, the entropy change, $\Delta S$ is equal to the heat exchanged by the system with the surroundings under reversible conditions, $Q_{rev}$, divided by the absolute temperature, T at which the heat is exchanged. It follows, that for the same value of $Q_{rev}$ the value $\Delta S$ is inversely proportional to the absolute temperature T.

When summarised, we can say: Entropy is a thermodynamic function which is a measure of the disorder of a system—a disorder may be thought of as having a two-fold character, a positional disorder, which is a disorder of molecular arrangement, and an energetic disorder which is a disorder of energy distribution related to the possible distributions of the energies among all the molecules of the system.

As the temperature becomes lower, the entropy of any system decreases, since both the positional and the energetic disorder decrease, in fact, at the lowest possible temperature, absolute zero, the entropy of any substance in the form of a perfect crystal, is taken to be zero.

Free Energy of a System:

The object of a thermodynamic analysis of a real process is the determination of the efficiency of the process from the standpoint of energy utilization. If $W_{usefulmax}$ is negative (work done by the system) the transformation can take place spontaneously, if $W_{usefulmax}$ is positive (work is done on the system) the transformation is not spontaneous, and in fact, work must be expended to carry it out.

$$W_{usefulmax} = \Delta H - Q_{rev} \text{ and}$$

$$Q_{rev} = T\Delta S \text{ and}$$

$$W_{usefulmax} = \Delta H - T\Delta S$$

Again, $W_{usefulmax}$ represents the change of the system to do useful work in passing at constant temperature and pressure from a specified initial to a specified final state. This capacity of the system to do useful work when it is in a given state is called the Gibbs Free Energy, and is indicated as G. Therefore, $$W_{usefulmax} = G_f - G_i = \Delta G$$

$$\Delta G = \Delta H - T\Delta S$$

These expressions tell us that when a system passes at constant temperature and pressure from a specified initial state to a specified final state, the change in the free energy of the system, $$\Delta G = G_f - G_i$$

is equal to the maximum useful work involved in the transformation. Therefore, if $W_{usefulmax}$ is positive (work done on the system), the free energy of the system increases in the transformation ($\Delta G$ is positive). Conversely, if $W_{usefulmax}$ is negative (work done by the system), the free energy of the system decreases ($\Delta G$ is negative).

Also, at constant temperature and pressure, the free energy change, $\Delta G$ is equal to the change in the enthalpy, $\Delta H$ minus the product of the absolute temperature T and the entropy change $\Delta S$.

When we consider the unit involved in the equation, $\Delta G = \Delta H - T\Delta S$, then if we express $\Delta H$ in $CAL/MOLE$, T in $DEG.K$. and $\Delta S$ in $CAL/MOLE \times DEG$. then $\Delta G$ is expressed in $CAL/MOLE$. Therefore, $\Delta G$ represents the quantity of energy per mole, which is free to do useful work, when a system passes from a specified initial to a specified final state.

The $\Delta G$ values for some specific processes are often designated by placing the abbreviated name of the process as a subscript after the symbol $\Delta G$, just as we did for the $\Delta H$ values. For example, we write $\Delta G_{fus}$, $\Delta G_{vap}$, and $\Delta G_{diss}$ to indicate respectively, the free energy change of a fusion, a vaporization process, and the dissociation of a molecular substance into its isolated atoms.

Standard Free Energy Formation ($\Delta G°_{form}$) of a Compound:

This term is used to indicate the free energy change of the reaction in which a specified compound, at a certain temperature and pressure, is formed from its elements in their standard state at the same temperature by convention, all elements in their standard state at that time are assigned a $\Delta G°_{form}$ equal to zero.

Influence of Temperature on the $\Delta G$ of a Reaction.

The value of the free energy change, $\Delta G$ for a specified reaction, therefore, the capability of the reaction to take place spontaneously depends largely on the temperature at which the reaction occurs. In other words, a reaction which is thermodynamically forbidden, ($\Delta G$ = positive) at a certain temperature and pressure, can at a higher temperature be thermodynamically permitted, ($\Delta G$=Negative). Actually, the change from a thermodynamically forbidden to a permitted reaction is predominantly the result of the effect of the absolute temperature, T on the magnitude of the T$\Delta$S energy term.

The following, generally holds true for any reaction in which the entropy of the system increases (disordering reaction).

If the reaction cannot occur spontaneously at a given temperature because of a large unfavourable $\Delta H$ (strongly endothermic reaction), a rise in temperature will make the favourable T$\Delta$S factor relatively more important.

Consequently, there is always a certain temperature, even though it is sometimes an extremely high one, at which the favourable T$\Delta$S term finally out weighs the unfavourable $\Delta H$ term, so that the reaction becomes thermodynamically permitted. One kind of endothermic reaction which can always be obtained spontaneously provided the temperature is high enough, is the dissociation of substances (elements and compounds) into their atoms.

In the process of atomization of a substance the products always have a greater entropy than the reactant, and the process always results in an increase in entropy ($\Delta S$ is positive ).

Of course a large quantity of energy is required, for an atomization reaction, $\Delta H_{atomiz}$ has a large positive value, because atomization involves the breaking of the strong chemical bonds which hold together the atoms of the reactant in the molecule, or in the ionic crystal, or in the metallic state.

In terms of practical utility related to the present invention, or the preferred catalysts or reactants used in the present invention, will follow the basic Laws of Science stated above. It has been previously stated in the content of the objects of the present invention, that it will use more than one catalyst, one of which will be employed as a diffusion membrane as well as a reactant. The preferred material used in the present invention to provide the multiple function required, is palladium or alloys of palladium.

The basic Laws of Science related to palladium or its alloys as a reactant has been previously stated, however, the rate of diffusion of hydrogen through the actual solid membrane need to be defined.

The rate of diffusion of hydrogen through the solid membrane will be governed by the diffusion coefficient, D, appropriate to its chemical composition (i.e., in the case of palladium whether this is either $\alpha$- or $\beta$- phase), and to the concentration gradient across the membrane and to its thickness.

In addition, however, the overall rate of permeation also is dependent on the catalytic efficiency of the intermediate reaction steps on the surfaces of exit and entry, and also on the transport of the products (superheated steam, hydrogen/oxygen) up to and away from these surfaces.

Next it seems worthwhile to briefly introduce the simplest diffusion relationships which might be expected to apply when diffusion through the hydrided palladium or its alloys is indeed the slowest stage.

Provided transport of hydrogen through the solid palladium governs the rate of permeation, and further provided that there are no sharp discontinuities of composition in the solid (such as boundary between regions of $\alpha$- and $\beta$- phases) the rate of permeation, P can be written in terms of Fick's First Law as:

$$P = D \frac{(C_{entry} - C_{exit})}{\alpha}$$

where $D(CM^2SEC^{-1})$ is the diffusion coefficient for the particular phase, $\alpha$ is the thickness of the membrane and $C_{entry}$ and $C_{exit}$ are the concentrations of hydrogen dissolved in the membrane at the interfaces of entry and exit, respectively.

Then with $\alpha$ expressed in CM. and the concentrations of hydrogen in the solid expressed as relative volumes (i.e. ccH$_2$/ccPd-cf Table 2.1) the permeation rates are obtained as ccH$_2$/cm$^2$/cm.

Expressing Fick's Equation in Terms of Pressure:

Relationships between permeation rates and diffusion constants often have been written in terms of gas pressures or powers of the gas pressure rather than in terms of concentrations. This is a more convenient form in which to obtain a permeation rate by insertion of experimentally determined values of pressure and perhaps it may also be the result of widespread interest in the interpretation of problems concerning the relationships between diffusion rates and pressures at very low pressures. However, from the view point of those not well versed in diffusion problems it rather directs attention away from the fact that the critical variable is the solubility of gas in the solid as a function of pressure.

In practice, experimental results show that over wide ranges of pressure the solubility of hydrogen in nickel or platinum is approximately directly proportional to the square root of pressure i.e., $$C = kp^{\frac{1}{2}}$$

A similar approximation, with characteristic values of K, is found to hold fairly well for the relationship between pressure and the solubility of hydrogen in the $\alpha$-phase of the Pd/H system.

Substitution for C in equation $$P = D\frac{(C_{entry} - C_{exit})}{\alpha} \text{ gives } P = kD\frac{(P^{\frac{1}{2}}_{entry} - P^{\frac{1}{2}}_{exit})}{\alpha}$$

Better approximations of the correct concentration have been achieved by equating concentration (hydrogen content) to alternative powers of pressure, leading to a more generalised relationship $$P\ kd\frac{(P^{\eta}_{entry} - P^{\eta}_{exit})}{\alpha}$$

where values of $\eta = 0.8$ or $0.68$ at particular temperatures and ranges of pressure. In general, values of $\eta$ are obtained from plots of LogP against Logp.

In deriving diffusion coefficients from permeation rates by means of the Fick First Law Equation, it has to be assumed that equilibration between gas and solid is complete and rapid at both the entry and exit surfaces, so that it is diffusion through the solid which is the slow and rate-determining step, and so that the concentrations of hydrogen at the surfaces may be derived from the gas pressures through p-C-T relationships. In general, the surfaces of palladium membranes do not readily equilibrate with molecular hydrogen at room temperature. However, success in this respect has been achieved by various activation procedures, such as by plating on a layer of palladium black, or by contacting the surfaces with material such as copper which are more efficient than palladium for dissociating molecular hydrogen and from which the dissociated atoms migrate to the palladium surface. The preferred material used in the present invention for activation is copper.

At present, it seems generally accepted that temperatures exceeding 250° C. is needed to achieve the required permeation rates. The experimental work has shown the necessity maintaining temperature above 250° C. as well as movement and circulation of the gas at the input or upstream side of the membrane. Without such circulation, permeation rates have been found to decrease to negligibly low values. When this movement or circulation maintained an excellent results have been obtained and the permeation rates were maintained for prolonged periods.

SUMMARY OF THE INVENTION

In an effort to more completely determine the characteristics of the present invention and the method of catalytic hydrogenation and of the evolution of hydrogen from super-heated steam in relation to the present invention, the method needs to be defined, which is comprising the steps of (a) providing a reactant comprising a metal or oxide thereof capable of displacing hydrogen continuously from super-heated steam exothermically to form an oxide of said metal at a higher oxidation number, said metal oxide of higher oxidation number being capable of dissociation or disproportionation spontaneously to release oxygen at a predetermined dissociation temperature in the absence of free oxygen. Furthermore said metal reactant or reactants having a predetermined ratio in relation to the surface area of the input or upstream side and the output side of the said metal reactant or reactants.

(b) providing means to isolate the said metal reactant or reactants from the environmental surrounding in a manner that, neither matter nor energy exchanges with its surroundings therefore providing an isolated system.

(c) heating the output side of the said metal reactant or reactants in a manner that, a predetermined temperature differention is maintained inbetween the input or upstream side or face and the output side or face of the said reactant, providing a means to maintain a temperature of the input or upstream face at which it will displace hydrogen from super-heated steam or water.

(d) passing super-heated steam over said reactant; whereby said metal oxide of higher oxidation number and hydrogen are formed exothermically.

(e) removing said hydrogen, by using permeable diffusion membranes such as palladium or its alloys, capable of decomposing super-heated steam in a predetermined ration to the quantity produced by said metal reactant, therefore, assisting the said metal reactant in the diffusion of hydrogen from the said super-heated steam, as well as providing a means to remove hydrogen from the reactant chamber in a continuous manner. Furthermore, the method recognises the necessity of maintaining a predetermined pressure differential between the entry and the exit surfaces of the diffusion membranes in addition to the generally accepted fact, that temperatures exceeding 250° C. is needed to achieve the required permeation rates which is further improved by maintaining continuous circulation or movement of hydrogen at the entry or upstream side of the membrane as well as ensuring an improved activation procedure whereby a defined portion of the surface area of the palladium or its alloys is in contact with material such as copper.

(f) dissociating oxygen from said metal oxide of higher oxidation number by removing free oxygen from the vicinity of said reactant with said reactant being at a temperature above said predetermined dissociation temperature, to thereby form said metal or oxide thereof and oxygen.

(g) removing said oxygen continuously during operation which is providing a means thereof to generate hydrogen in a continuous manner.

Furthermore, the present invention provides an apparatus for catalytic hydrogenation and of the evolution of hydrogen from super-heated steam with spontaneous regeneration of the reactant comprising:

(a) A plurality of reaction chambers, (b) A reactant in each reaction chamber, said reactant comprising a metal capable of displacing hydrogen from super-heated steam exothermically to form an oxide of said metal, said metal oxide being capable of dissociation or disproportionation spontaneously in the absence of free oxygen.

(c) A permeable diffusion membrane in each reaction chamber, said membrane comprising a metal or its alloys capable of decomposing super-heated steam in a predetermined ratio as well as providing a means to remove hydrogen from the said reaction chamber in a continuous manner.

(d) Means to isolate said reaction chambers from the environmental surrounding.

(e) Means for heating said reactant to a temperature at which it will displace hydrogen from super-heated steam.

(f) Means for generating super-heated steam.

(g) Means for passing steam to said chambers from said generating means.

(h) Means for removing hydrogen from said exit surface of the permeable diffusion membrane comprising a means to cool the hydrogen, a means to pump hydrogen to predetermined pressure into a tank capable of withstanding the said pressure with a suitable safety margin.

(i) Valve means for directing hydrogen flow from said reaction chambers, through cooling means through said hydrogen-pump into the said pressure vessel.

(j) Control means for selectively activating a switching means which in turn will energise said heating means, used for reactant regeneration, so that hydrogen generation and reactant regeneration occurring continuously in said apparatus.

BRIEF DESCRIPTION OF THE DRAWINGS

A preferred form of the present invention will now be described by way of example with reference to the accompanying drawings wherein:

FIG. 13 is a side elevation of the apparatus embodiment.

DESCRIPTION OF PREFERRED EMBODIMENT

Figure 14:
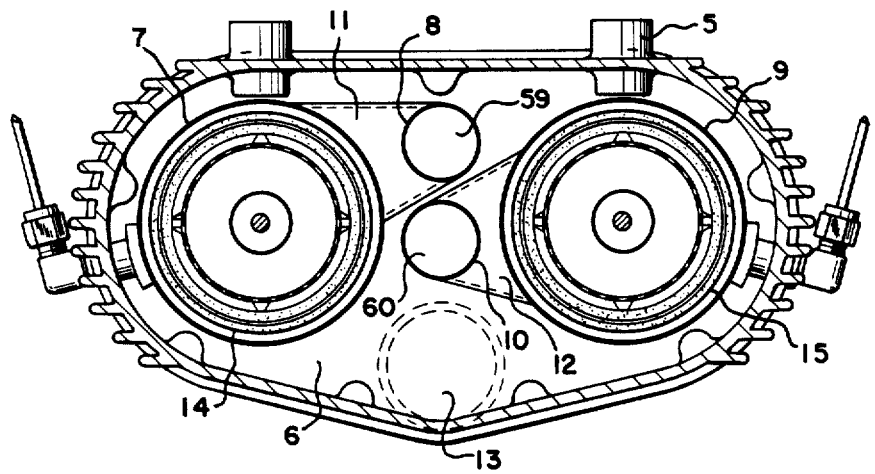
FIG. 14 is a verticle cross section of the apparatus embodiment taken on the line 14—14 of FIG. 13.

Prior to a detailed description of the method and apparatus of the present invention, an indepth discussion of the principles upon which the inventive method and apparatus work is essential. It has already been mentioned that the reactant used in the instant invention is a metal capable of displacing hydrogen from superheated steam exothermically to form an oxide of the metal and whose oxide is capable of dissociation or disproportionation spontaneously in the absence of free oxygen in addition to the capability of the permeable diffusion membranes which will assist the metal reactant in the diffusion of hydrogen as well as providing a means to removing said hydrogen from the reaction chambers. It should be noted that while this is the broad definition of the reactants, it can be readily understood by one of ordinary skill in the art that this does not mean that these reactions must take place at room temperature, but merely that they are capable of taking place at some practically attainable temperature. Thus, to initiate the hydrogen generating process we require superheated steam which will react spontaneously with the permeable diffusion membranes thus producing hydrogen, while the reactant metal is heated to that temperature at which it will displace hydrogen from superheated steam exothermically. Since the reaction is exothermic, the reaction will be self-sustaining. According to the instant invention, this initial heating may be done by the use of a gas or hydrogen and, may be initiated by an electrical means. Of course, there is a practical aspect which dictates what metals will be useful in the present invention, that being that the temperature at which the metal will displace hydrogen from superheated steam exothermically and the temperature at which metal oxide will dissociate or disproportionate spontaneously which should be below the melting point of the metal and the diffusion membrane, so that the practical problems associated with containing the reactant and the reaction can be easily solved.

With these requirements in mind, it has been surprisingly found that there are two metals one of which possess the important physical characteristics required of a reactant in the practice of the present invention and, one of which possess the physical characteristics required as a permeable diffusion membrane used in the present invention. Thus, for this reason, these two metals are the preferred materials in the present invention.

These two metals are iron or iron-manganese alloy, of course palladium and or its alloys.

Iron.

Iron is the most abundant element in the earth's crust, and the second most abundant metal, after aluminium in nature, iron only occurs in chemical combination, chiefly as an oxide or carbonate, less commonly as a sulphide. The principal ores are hematite, $Fe_2O_3$ magnetite, $FeO.Fe_2O_3$; and a hydrated iron oxide called limonite $Fe_2O_3 \times H_2O$. The principal carbonate ore is siderite, $FeCO_3$. The most important sulphide ore is iron pyrite, $FeS_2$. Pure metal iron is rarely used in industry, but steel—which is an alloy of iron with other metals, containing very small percentage of carbon—is used in enormous quantities.

Manganese.

Manganese occurs in many oxide ores, the most important of which is pyrolusted, $MnO_2$ a black mineral. Less important ores are braunite, $Mn_2O_3$; manganite, $Mn_2O_3.H_2O$; and hausmanite, $MnO.Mn_2O_3$. Manganese is also present as a fairly abundant impurity in many clays and shells, and in most iron ores. Metallic manganese as such is not used to any appreciable extent in industry.

These two metals, iron and manganese, are among the eight elements which constitute the first transition series of elements, palladium however, is one of the six elements of group 8 in the second and third transition metal series.

Palladium—Pd.

As indicated in the schematic periodic chart of the transition elements in table 2.2 palladium is one of the nine elements commonly referred to as group 8 of the periodic classification. Also as stated above it is one of the six elements of group 8 in the second and third transition metal series, which are also commonly referred to as the "platinum Metals".

In a vertical grouping, palladium is intermediate between nickel and platinum itself all three of these elements being among those most commonly employed as catalysts for hydrogenation reactions.

Geologically, all six platinum metals generally occur in conjunction with one another. In addition to specifically platiniferous ores, a further workable source is provided by the by-products of nickel refining. Although there can be substantial variations in relative proportions, in general platinum itself forms the largest fraction of the final precious metal concentrates, with palladium as the next most abundant element. Alloy mixtures of the platinum metals have been known for several centuries but it was not until the 19th century that Woolastion and Tennant succeeded in isolating the individual elements.

Table 2.3 lists various physical properties of the platinum metals and it may be seen that palladium has the lowest melting point and density of the group, but that it has a markedly higher magnetic susceptibility. As May be expected from its lower melting point, palladium has a higher vapour pressure than the other platinum metals over the range of temperatures up to its melting point, and an accompanying lower heat of vapourization.

The First Transition Series, The Transition Metals and Physical Properties:

In ordinary environmental surround, all transition elements are solid metals, usually of a white or light grey colour which can be polished to a brilliant finish. Many transition elements occur in more than one crystalline form; iron for example, can exist in a cubic close-packed, or in a body-centered cubic form, depending upon the thermal conditions to which it was submitted during crystallization and on the presence of impurities. The transition metals are hard, malleable, and ductile, with excellent mechanical properties.

The transition elements have relatively high densities and very high melting and boiling points, with high heats of atomization.

These properties evidences, that the atoms of these elements are held together by very strong metallic bonds which persist even in the molten state. Strength of bonding between atoms of metals depends on the interaction between the electrons in their outer most shell. If the valence electrons are available for bonding, and the greater number of valence electrons available, the stronger is the resultant bonding. The atoms of the transition elements have three or more electrons available for interaction, and at least one of these electrons is a d electron, consequently, the interatomic bonding is very strong.

Since the electron configurations of successive elements of the first transition series differ by only one electron in the third orbital, there are only slight differences in the ionization energies of adjacent elements, differences, which are not nearly as great as those between successive elements in a non-transition series.

Chemical Properties—Oxidation States.

All transition elements except Scandium and the heavier elements of group 3A (Yttrium and Lanthanum) exhibit a variety of oxidation states.

Scandium exhibits only one oxidation state, $+3$. But each of the other elements of the first transition series has two or more oxidation states ranging from the positive value corresponding to the periodic group number of the element, down to lower positive values, and finally to zero, or even to the negative values $-1$, and $-2$.

In their highest oxidation states, $+5$, $+6$, and $+7$ the transition elements form complex anions with oxide ions $O^=$ as the ligands.

In the complex oxydanions, the metal - to - oxygen bond has a largely covalent character, so the transition metals in the higher oxidation states resemble the non-metallic elements of the corresponding B groups.

In the $+2$, and $+3$ oxidation states, the transition elements form essentially ionic compounds with the most electronegative elements; the oxides MO, for example, are essentially ionic solids.

Electropositive Character and Reactivity.

As stated earlier, each element usually exhibits several possible oxidation states, and each element in a given oxidation state is characterized by a different set of physical properties—a certain value of the charge/radius ratio, a certain preferred co-ordination number and stereochemistry, a certain oxidation reduction potential, and so forth.

However, all of the varying characteristics between the transition elements in their several possible states, can be related logically to the two main factors that determine in general, the behaviour of all substances the thermodynamic and kinetic properties.

It should be pointed out that their positively charged ions have a great tendency to form co-ordination compounds with virtually all electron-pair donors, so that their chemistry always involves the reactions of complex species. All of the elements of the first transition series are electropositive as shown by their positive standard oxidation potentials, (in Tables of Standards) and they form very stable oxides.

At ordinary temperature, however, and particularly in compact form, these metals are kinetically unreactive because of a high activation energy related in part to their high heats of atomization.

The degree to which the metal is divided, the nature of the particle surface, and the thermal treatment to which the metal was submitted during its preparation, are usual factors that determine and control the kinetic reactivity of these metals.

Oxides of the Transition Elements, Formulas, and Crystal Structure:

The elements of the first transition series form a variety of oxides, evidenced by $MO$, $M_2O_3$, $M_3O_4$ or $MO.M_2O_3$, $MO_2$, $M_2O_5$, and $MO_3$.

Oxides of the $+2$ oxidation state are known for each and all elements of the series except Sc and Cr; the divalent oxides, MO have a crystal lattice of the NaCl type, with each $M^{++}$ ion octahedrally surrounded by 6 $O^=$ ions, and each $O^{32}$ ion octahedrally surrounded by $6M^{++}$ ions.

Oxides of the $+3$ oxidation state $M_2O_3$ are known for all elements of the series except for Co and Ni. These oxides have ionic lattices in which each $M^{+3}$ ion is also octahedrally surrounded by six $O^=$ ions, whereas $O^=$ ion is surrounded tetrahedrally by four $M^{+3}$ ions.

Oxides of the $+4$ oxidation state, $MO_2$ are known for Ti, V and Mn; they have the rutile structure with a 6:3 cation-to-anion crystal co-ordination.

Oxides of the formula $M_3O_4$, or $MO.M_2O_3$ contain one-third of the metal atoms in the $+2$ oxidation state and two-thirds in the $+3$ oxidation state. The structure of these oxides consists of ionic lattices in which $M^{++}$ ions, $M^{+3}$ ions, and $O^=$ ions alternate in a variety of regular patterns.

Thermodynamic Properties of Elements and Oxides.

Thermodynamic calculations over a wide range of temperatures are generally made with the aid of algebrail equations representing the characteristic properties of the substances being considered. The necessary integrations and differentiations, or other mathematical manipulations, are then most easily effected. The most convenient starting point in making such calculations for a given substance is the heat capacity at constant pressure. From this quantity and a knowledge of the properties of any phase transitions, the other thermodynamic properties may be computed by the well-known equations given in standard texts on thermodynamics.

Empirical heat capacity equations are generally of the form of a power series with independent variable.

$$Cp = a' + (b' \times 10^{-3})T + (c' \times 10^{-6})T^2$$

or:

$$Cp = a'' + (b'' \times 10^{-3})T + \frac{d \times 10^5}{T^2}$$

since both forms are used, then $$Cp = a + (b \times 10^{-3})T + (c \times 10^{-6})T^2 + \frac{d \times 10^5}{T^2}$$

The constants a, b, c, and d are to be determined experimentally, or by any valid theoretical or semi-empirical approach. The heat content, or enthalpy H, is determined from the heat capacity by a simple integration over the range of temperatures for which (1) is applicable.

Therefore, if 298.0° K is taken as a reference temperature, $$H_t - H_{298} = \int_{298}^{T} C_p dt \quad (2)$$

$$= a(T - 298) + \frac{1}{2}(b \times 10^{-3})(T^2 - 298^2) + \frac{1}{3}(c \times 10^{-6})$$

$$(T^3 - 298^3) - (d \times 10^5)\left(\frac{1}{T} - \frac{1}{298}\right)$$

$$= aT + \frac{1}{2}(b \times 10^{-3})T^2 + \frac{1}{3}(c \times 10^{-6})T^3 - \frac{d \times 10^5}{T} - A$$

where all of the constants on the right hand side of the equation have been incorporated in the term $- A$.

In general, the enthalpy is given by a sum of terms, such as (2) for each phase of the substance involved in the temperature range considered, plus terms which represent the heats of transition:

$$H_T - H_{298} = \Sigma \int_{T_1}^{T_2} C_p dt + \Sigma \Delta H_{tr}$$

In a similar manner, the entropy S is obtained from (1) by performing the integration.

$$S_T - S_{298} = \int_{298}^{T}\left(\frac{C_P}{T}\right) dt = a \ln\left(\frac{T}{298}\right) + \quad (3)$$

$$(b \times 10^{-3})(T - 298) + \frac{1}{2}(c \times 10^{-6})(T^2 - 298^2) -$$

$$- \frac{1}{2}(d \times 10^5)\left(\frac{\frac{1}{T^2} - \frac{1}{298^2}}{}\right) =$$

$$a \ln T + (b \times 10^{-3})T + \frac{1}{2}(c \times 10^{-6})T^2 - \frac{\frac{1}{2}(d \times 10^5)}{T^2} - B'$$

Or:

$$S = a\, 2.303 \,\text{LOG}\, T + (b \times 10^{-3})T + \frac{1}{2}(c \times 10^{-6})T - \quad (4)$$

$$- \frac{\frac{1}{2}(d \times 10^5)}{T^2} - B$$

where $$(5)\ B = B' - S_{298}$$

From the definition of free energy G:

$$G = H - TS$$

The quantity $$G_T - H_{298} = (H_T - H_{298}) - T S_T$$

is obtained from (2) to (4):

$$G_T - H_{298} = -2.303_a T \,\text{LOG}\, T - \frac{1}{2}(b \times 10^{-3})T^2 - \quad (6)$$

$$\frac{1}{6}(c \times 10^{-6})T^3 - \frac{1}{2}\frac{(d \times 10^5)}{T} + (B + a) T + A$$

and also the free energy function $$\frac{G - H_{298}}{T} = -2.303_a \,\text{LOG}\, T - \frac{1}{2}(b \times 10^{-3})T - \quad (7)$$

$$\frac{1}{6}(c \times 10^{-6})T^2 - \frac{1}{2}\frac{(d \times 10^5)}{T^2} + (B + a) - \frac{A}{T}$$

Catalytic Production of Hydrogen:

$$2\, Fe_{(s)Heated} + 3H_2O_{(G)Steam} \rightarrow 3H_2 \uparrow_{(G)} + Fe_2O_{3(s)}$$

1340.4 grams + 648.0 grams → 72.72 grams + 1915.68 grams

To determine the amount of oxygen reacted into the $Fe_2O_3$ subtract 1915.68 − 1340.4 = 575.28 Grams Oxygen.

The equation evidences that 72.72 grams of hydrogen is produced.

Since hydrogen weighs 0.00531 pound per cubic foot, some 30.19 cubic feet of hydrogen is produced. The original iron, Fe, which weighed 1340.4 grams, now weighs 1915.68 grams, the additional weight being the oxygen stored in the iron oxide, $Fe_2O_3$.

This amounts to 575.28 grams of oxygen which must now be removed from the ferric oxide, $Fe_2O_3$, so that we can continue to generate hydrogen gas. When this oxygen is removed, the $Fe_2O_3$ becomes Fe, which of course, is exactly what is wanted.

The Reaction in Detail.

Considering the components to the reaction individually, the structure or iron can exist either in a cubic close-packed or in a body-centered form, depending on the thermal conditions to which it had been exposed during its crystallization, and on the presence of impurities.

This first transition series metal, iron, has a relatively high density, high melting and boiling point, and a very high heat of atomization. These properties evidence that iron atoms are held together by very strong metallic bonds, which persist in the molten state. As stated earlier, the atoms of iron in the molten state, have three or more electrons available for interaction, and the presence of electrons make the interatomic bonding very strong.

The gaseous oxygen molecule, $O_2$ is a diatomic molecule in which the two oxygen atoms share one pair of electrons in a sigma-bonding orbital and another pair of electrons is in a Pi-bonding orbital. Each oxygen atom also has two lone pairs of electrons.

Finally, iron oxide $Fe_2O_3$ is thermodynamically stable with respect to decompostion to the metal and oxygen gas at ordinary temperatures.

Oxides of this metal in different oxidation states have different relative stabilities, and consequently have the capacity to partly dissociate or to disproportionate, however, such actions will not take place at ordinary temperature. For example of the two oxides $Fe_2O_3$ and $Fe_3O_4$, the former is more stable at room temperature.

$$2Fe_3O_4 + \tfrac{1}{2}O_2 \rightarrow 3Fe_2O_3$$

where
$\Delta H° = -55K$ CAL/MOL-EQN and
$\Delta G° = -46$ K CAL/MOL-EQN

Note that this reaction does not actually proceed at room temperature because the activation energy is to high, therefore, thermodynamically forbidden.

In view of the foregoing the enthalpy of the reaction will now be described wherein:

Step One—Atomization of Iron Metal (bond breaking)

$\Delta H_{atomiz} = +99.7$ K/CAL Mole at 25° C. and 1 ATM $+99.7 \times 2$ (Moles) $= 199.4$ K/CAL Mole EQN Step Two—Dissociation of Oxygen Molecules (bond breaking)

$$O_2(g) \rightarrow 2O(g)$$

$\Delta H_{atomiz} = 119.2/2 \times 6 + 357.6$ K/CAL Mole EQN

Step Three—Ionization of each Iron Atom $$Fe(g) \rightarrow Fe^{++}(g) + 2e$$

$\Delta H_{ioniz} = Fe(g) \rightarrow Fe^{++}(g) + 2\bar{e}$ $\Delta H_{ioniz} = 261.0 \times 2$ (Moles) $= 522.0$ K/CAL Mole EQN This represents the sum of the first and second ionization energies of iron.

Step Four—Reaction of each Oxygen Atom $$O(g) + 2e \rightarrow O^=(g)$$

$\Delta H_{electronic\ affinity} = 159.9$ K/CAL Mole O(g) Atoms $\Delta H_{electronic\ affinity} = 159.9 \times 3$ (Moles) $= +468.9$ K/CAL EQN Step five—Reaction of $Fe^{++}(g)$ with $O^=(g)$ to Form an Ionic Solid (bond forming)

$$Fe^{++}(g) + O^=(g) \rightarrow Fe^{++}O^=(g)$$

$\Delta H_{bond\ forming} = -1941.9$ K/CAL Mole EQN

Figure 1:
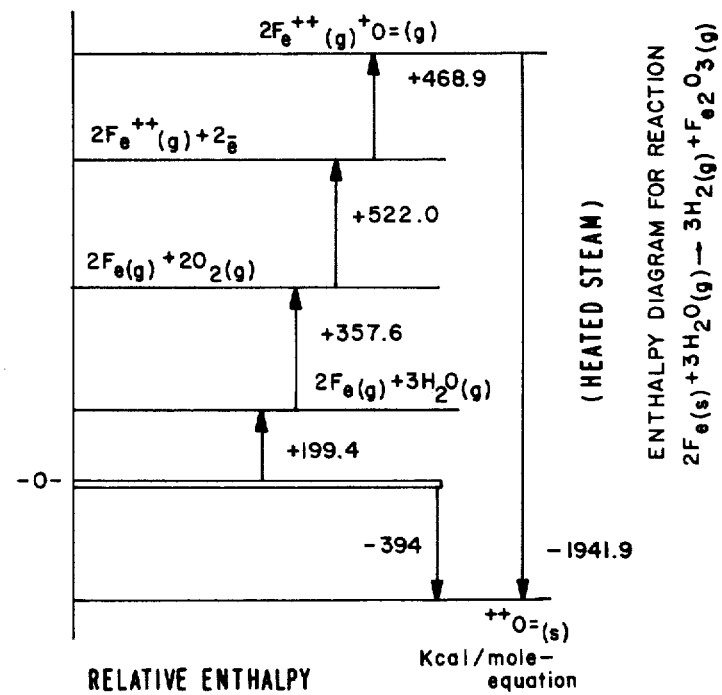
FIG. 1 is an enthalpy diagram for the reaction of iron with super-heated steam to form hydrogen and ferric oxide.

Then $-1941.9 + (+199.4 + 357.6 + 522.0 + 468.9)$ $= -1941.9 + 1547.9$ $= -394$ K/CAL/Formula $= -197$ K/CAL/Mole $Fe_2O_3$ FIG. 1 provides a graphic illustration of the enthalpy of the foregoing reaction as reference.

Reduction of iron oxide using hydrogen.

In the conventional method, the oxide is reduced by hydrogen $$Fe_2O_3\ (heated) + 3H_2 \rightarrow 2Fe + 3H_2O$$

(1915.68)grams (72.72)grams (1340.4)grams (648.0)grams

The equation above evidences the well known fact that iron oxide can be reduced with hydrogen when the $Fe_2O_3$ is heated in an atmosphere consisting of this gas. The equation also evidences the fact that this conventional method of reducing metal oxides cannot be of interest commercially because when accomplished in this conventional manner the method utilizes each and every gram of the hydrogen produced earlier with the same iron.

According to the present invention, however, as it has been previously stated in the content of the objects of the present invention, it will use more than one catalyst, one of which will be employed as a diffusion membrane as well as a reactant. The preferred material used to provide the multiple functions is palladium - silver alloy (76% + 24% respectively). This reactant has the capability to produce hydrogen in a predetermined rate over and above the quantity provided by the iron catalyst, therefore offering a feasible means to reduce iron oxide by using hydrogen to heat said iron oxide or catalyst to a predetermined dissociation temperature. Furthermore, it has been found that at temperatures above 750° C. ferric oxide has an increasing tendency to dissociate, and it will do so unless a considerable amount of oxygen is maintained in its environmental surround. In other words, when all oxygen is eliminated from the environmental surround, ferric oxide will in fact dissociate or disproportionate at temperatures above 750° C. to the point where the oxidation number is lowered and the action can be continuous without lessening the action or reaction.

It has been also found that when the supply of oxygen is limited in the atmospheric surround, steam has a very strong reducing action on ferric oxide. An investigation into the thermodynamics of this particular reaction revealed that the $\Delta G$ values of the formation of water vapour are considerably more negative at all temperatures than the change:

$$4Fe_3O_4 + O_2 \rightarrow 6Fe_2O_3$$

and also more negative than the change:

$$6FeO + O_2 \rightarrow 2Fe_3O_4$$

Reduction of iron oxide is therefore predicted by water itself under specific conditions.

The successive reduction of iron oxides may be represented by the following equations:

$$6Fe_2O_3 - O_2 = 4Fe_3O_4 = 4Fe_2O_3 + 4FeO$$

$$2Fe_2O_3 - O_2 = 4FeO$$

$$2FeO - O_2 = 2Fe$$

This type of decomposition occurs only with oxides of elements that have variable oxidation number, and the selection of iron as the preferred metal in the present invention is because of this particular physical characteristic, plus the fact that it is among the very few metals which have the capacity to displace hydrogen from super heated steam when the metals are heated to a minimum of red-heat. This reaction is exothermic and supports itself.

Another important consideration in the practical selection of this metal is that it is readily available and economically feasible.

When this metal is machined, in order to expose maximum of its surface area to the reaction, it will react very positively in the manner described.

Since dissociation of the oxides into the elements becomes increasingly active at temperatures above 750° C., and since these oxides do not reach the melting point until a temperature of 1540° C. is reached, we therefore can and do impose working temperature and controlled atmosphere and time on these oxides, which then initiate and accomplish reductions in oxidation numbers by heat imposed dissociation only.

Furthermore, the presence of steam (water) during this period actually lowers the temperatures required (750° C. as indicated) to accomplish the reduction.

Additional facts about oxygen.

1. The radius of the $O^=$ ion (1.32Å) is about equal to that of the Fe ion (1.33Å). In general the compounds with the highest lattice energy are those composed of small divalent and trivalent cations, for example $Mg^{++}$ and $Al^{++}$, and next the relatively small divalent anions such as the oxide ion $O^=$.

2. Oxygen gas is a little heavier than air. It has a density of 1.429 grams per liter, measured at 0° C. and 1 ATM. pressure, compared with the average density of air, which is approximately 1.30 grams per liter, measured under the same conditions.

3. Oxygen gas is slightly paramagnetic, that is, it is physically attracted by a magnet much like a piece of iron, and even though the molecules may be far apart the magnetic effect is valuable.

Stability of Compounds.

In commenting on the stability of compounds, it can be stated that a given compound which under specified conditions of temperature and pressure does not have the capacity to decompose into its elements and is carefully excluded from the presence of any substance that could act as a possible reactant, may still have the capacity to decompose by undergoing reactions by or with itself. For example, it may undergo decomposition to form different compounds, disproportionation (self-oxidation-reduction), or polymerization.

Spontaneous Reaction.

The guiding principle for deciding whether a physical or chemical transformation can take place spontaneously at a constant temperature and pressure is:

All systems tend to go from a state of higher free energy to a state of lower free energy.

Therefore, a system can pass spontaneously from its initial to its final state, if the transformation involves a decrease in the free energy of the system ($\Delta G$ is negative).

In other words, a system transformation tends to proceed spontaneously in that direction which brings the system to a state of minimum free energy. Since the change in free energy at constant temperature and pressure is given by the expression $\Delta G = \Delta H - T\Delta S$, the capacity of a given system to undergo a spontaneous transformation depends on two independent energy terms—the $\Delta H$ energy term and the $T\Delta S$ energy term, each having its own sign and magnitude for the transformation considered:

1. A negative value of $\Delta H$ (exothermic) is favourable to spontaneity since the $T\Delta S$ term is preceded by a minus sign in the expression $$\Delta G = \Delta H - T\Delta S.$$

2. A positive value of $\Delta S$ (disordering reaction) is favourable to spontaneity (T, the absolute temperature is always positive).

To summarize: $\Delta G = \Delta H - T\Delta S$ $\Delta H$ (enthalpy term) exothermic reaction $\Delta H$ negative ∴ favourable to spontaneity $\Delta H$ (enthalpy term) endothermic reaction $\Delta H$ positive ∴ unfavourable to spontaneity $\Delta S$ (entropy term) disordering reaction $\Delta S$ positive ∴ favourable to spontaneity $\Delta S$ (entropy term) ordering reaction $\Delta S$ negative ∴ unfavourable to spontaneity Therefore, the actual value of $\Delta G$, for a given transformation at constant temperature and pressure depends on the relative values of the $\Delta H$ and $T\Delta S$ energy terms.

Influence of Temperature on the $\Delta G$ of a Reaction.

From all of the foregoing, it can be readily understood that the value of the free energy change, $\Delta G$ and therefore the capacity of the reaction to take place spontaneously depends to a very large extent on the termperature at which the reaction occurs.

The expression $\Delta G = \Delta H - T\Delta S$, itself tells us that the value of the temperature does in fact influence the value of $\Delta G$, because, not only the $T\Delta S$ energy term directly proportional to absolute temperature T but also, both $\Delta H$ and $\Delta S$ have a characteristic dependence.

Then, assuming that the values of the enthalpy and entropy changes $\Delta H$ and $\Delta S$ of a specified reaction do not vary within a certain interval of temperature, then a change of the temperature at which the reaction takes place can alter the balance between the $\Delta H$ and $T\Delta S$ energy terms, which can change both the magnitude and the sign of $\Delta G$.

In other words, a reaction which is thermodynamically forbidden ($\Delta G$ = positive) at a particular temperature and pressure, can at a higher temperature be thermodynamically permitted ($\Delta G$ = negative). If the reaction cannot occur spontaneously at a given temperature because of a large unfavourable $\Delta H$ value (endothermic) a rise in temperature will make the favourable $T\Delta S$ factor relatively more important.

Consequently, there is a particular temperature even though it may be a high one at which the favourable $T\Delta S$ term finally outweighs the unfavourable $\Delta H$ term, so that the reaction is thermodynamically permitted.

Producing Hydrogen, $H_2$ Using Pure Iron Oxide.

As a member of the transition element family, iron exhibits a variety of oxidation states. At ordinary temperature and pressure, all of the iron oxides are thermodynamically stable with respect to decomposition to the metal and oxygen gas. Iron oxides in different oxidation states have different relative stabilities, and as a consequence of this, have the capacity to partly dissociate, or to disproportionate. However, such reactions do not occur to any detectable extent at ordinary temperature. In other words, the behaviour of the metallic element iron and its ionic solid compounds, is determined largely by kinetic factors.

It is well known that the reaction of iron and its oxides (at high temperatures) with steam, produces hydrogen gas and this reaction further oxidizes the metal (or oxide). This reaction is exothermic, so that once started, it gives off enough heat to maintain the temperature required for the reaction to maintain itself at the desired rate. The data values used were taken from U.S. Bureau of Mines Bulletin 542, U.S. Atomic Energy Commission Report ANL 5750 and National Bureau of Standards Publications.

Reaction:

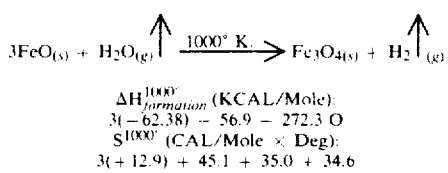

$$\Delta H_{formation}^{1000°}  (KCAL/Mole):$$
$$3(-62.38) - 56.9 - 272.3\ 0$$
$$S^{1000°}  (CAL/Mole \times Deg):$$
$$3(+12.9) + 45.1 + 35.0 + 34.6$$

From these values the $\Delta H$ and $\Delta S$ of the above reaction can be calculated:

$$\Delta H_{reaction}^{1000°} = \Delta H_{form}^{1000°}\text{(off all products)} - \Delta H_{form}^{1000°}\text{(of all reactants)}$$

$$= -272.3 - (-244.04) = -28.26\ \text{KCAL/Mole} - \text{EQN}.$$

$$\Delta H_{react}^{1000°} = -28.26\ \text{KCAL/Mole} - \text{EQN (favourable to spontaneity)}$$

$$\Delta S_{react}^{1000°} = S\text{(for all products)} - S\text{(for all reactants)}$$

$$= +69.6 - (+83.8) = -14.2\ \text{CAL/Mole} - \text{EQN} \cdot \text{Deg}$$

$$T\Delta S = 1000_{degrees} \times (-14.2)$$

$$= -14.2\ \text{KCAL/Mole} - \text{EQN}.$$

$$\Delta G = \Delta H - T\Delta S$$

$$= -28.26 - (-14.2) = -14.06$$

$$\therefore \Delta G = -14.06\ \text{KCAL/Mole} - \text{EQN (favourable to spontaneity)}$$

Heat generated by exothermic reaction assuming a two minute cycle:

$-14.06$ KCAL/Mole — EQN $\therefore 14.06 \times 80$ (Moles) $\times 30$ (Cycle) $= 33744.0$ KCAL/HR
$= 133896.19$ BTU/HR Heat energy required to dissociate $= 111,600$ BTU/HR.

Energy balance two minute cycle:

$133,896.19 - 111,600 = 22,296.19$ BTU/HR (excess)

Therefore we notice that the entire reaction is exothermic but results in a decrease in entropy, or a greater order in the system. The $\Delta H$ energy term is favourable to a spontaneous transformation ($\Delta H$ is negative), whereas, the $T\Delta S$ energy term is actually unfavourable ($T\Delta S$ is negative) that is, the entropy, S of the system decreases in passing from the initial to the final state. In this particular case the reaction is capable of proceeding spontaneously because the favourable $\Delta H$ term outweighs the unfavourable $T\Delta S$ term.

Thus, it will be appreciated that, consistant with the thermodynamic principles discussed above, the method of the present invention accomplishes the generation of hydrogen from super-heated steam using iron and palladium-silver alloy as the preferred catalyst to its original state in a novel manner. Since the hydrogen generating phase of the operation is exothermic, a good deal of the heat generated by that reaction is used in the reactant regeneration phase. It is noted, however, that additional heat will be needed in the reactant regeneration phase and this may be supplied by means of a timed, controlled, imposed internal heating of the oxide to elevate the temperature to the point of $\Delta H_{Diss}$ whereupon the oxide dissociates the gaseous oxygen atoms from the pure metal atoms, and the oxygen atoms are vented to the atmosphere or otherwise to where they cannot recombine with the metal.

During the desired time when the heat dissociation process is occurring, the oxygen can be purged from the reaction chambers by metering a calculated amount of hydrogen gas into the chambers where the dissociation operation is proceeding spontaneously. Alternatively the hydrogen gas can be burnt with oxygen, therefore it will produce the required heat and steam, which can be used to purge the remainder of the oxygen from the chambers. The use of hydrogen and steam thereof to create a draft which removes the paramagnetic oxygen atoms, and at the same time provides an atmosphere within the cavity which is favourable to the inventive concept is preferred. According to the present invention, therefore, theoretically an infinite number of cycles (start and stop) of hydrogen production-catalyst regeneration, without the possibility of introduction of contaminants or contamination, or without any loss in efficiency of the reactant metal as a result of other and undesirable reactions, may be performed.

One of the preferred apparatus used in the present invention will be described by reference to a certain embodiment which is presented in an exemplary manner and not to be considered limiting. Basically, this preferred embodiment of the apparatus presented is one of which will be used to power internal combustion engines in mobile (automobiles) or stationary application. It is to be distinctly understood that this embodiment may be suitably modified for use in a different environment. Furthermore this embodiment can be modified to suit a large power station or in any other application where hydrogen is required as fuel on demand.

Combustion processes in internal combustion engines.

The thermal efficiency of an internal combustion engine and or an automobile engine can be easily calculated.

Normally, data are generated by the physical testing of the engine, because the actual real-life efficiencies are usually much lower than calculated theoretical efficiency, perhaps only half as large. The practical losses include failure to burn the fuel completely, and to duplicate the cycle process exactly, the heat transferred from the engine, friction losses, etc. For purposes of this application, however, it is both valid and meaningful to calculate the thermal efficiency of an engine operating on gasoline in the normal mode, and then compare this data with the calculated thermal efficiency of the exact same engine operating on hydrogen. It will then be shown that the apparatus of the present invention can be designed in compliance with the theoretical demands according to the calculations, and then add whatever capacity is necessary to the design requirements to anticipate and correct for the practical losses which do in fact occur in conventional engines whether operating on gasoline or to a lesser extent when the same engine operates as described using hydrogen derived from superheated steam (or water) where the required heat to produce the said superheated steam may be the by-product of the combustion, or a nuclear reaction or perhaps it will be produced by an external electrical means.

The theoretical efficiency is the thermal efficiency of the cycle, and is equivalent to the fraction of the energy supplied, that is actually converted to work. Thermal efficiency of an engine or prime mover may be based on the output at the shaft per unit of heat supplied, or it may also be based on cylinder horsepower of the engine. The heat supplied and chargeable to internal combustion engines is the heat in the fuel. The heat chargeable is the heat supplied after deducting the heat losses in the exhaust.

The brake thermal efficiency of an engine is the fraction of the energy supplied in the fuel that is available as brake-horsepower. The heating value of the fuel must be known to evaluate the energy supplied. This is expressed in conventional units such as the British Thermal Unit (B.T.U.).

The number of BTU released by the combustion of a pound of fuel, 453.59 grams, is called the heating value, $Q_h$. For high grade gasoline this value is nominally 21,000 BTU per pound.

The power of the engine can also be expressed in BTU, because 1 BTU is equivalent to 778 foot pounds of work. One horsepower delivered continuously for one hour is therefore equivalent to 2546.4 BTU.

Since brake specific fuel consumption is the pounds of fuel burned in one hour to deliver one horsepower, brake thermal efficiency may be expressed as:

$$BTE = \frac{2546.4}{b.s.f.c. \times Q_h}$$

Charge requirements.

The amount of oxygen essential to support the combustion of fuel may be readily calculated if the chemical ingredients are known. It is customary to assume that gasoline is a mixture of many hydrocarbons that average approximately the same octane as $C_8H_{18}$.

With this assumption it is possible to write the combining equation for gasoline and air as:

$$C_8H_{18} + 12.5O_2 + 47.5N_2 \rightarrow 8CO_2 + 9H_2O + 47.5N_2$$

For one pound (453.59 G) of fuel, the equation reads:

1 LB.$C_8H_{18}$ + 3.5 LB.$O_2$ + 11.66 LB.$N_2$ → 3.09 LB.$CO_2$ + 1.42 LB.$H_2O$ + 11.66 LB.$N_2$ or

1 LB.$C_8H_{18}$ + 15.17 LBs.AIR → 16.17 LB.(Products-Combustion)

These equations represent the proportion for complete combustion. The imperfections of the combustion chamber, incomplete mixing of the fuel and air, insufficient time for the reaction to proceed to completion, and other unfavourable factors, prevent complete, or perfect combustion.

Empirically, a slightly lean mixture of about 16 to 1, is more economical than the 15.17 to 1 ratio mentioned above. The excess air helps complete the combustion, but less power is actually developed because a smaller amount of fuel is contained in the leaner mixture.

Further leaning is uneconomical because the burning rate of the charge is decreased. A somewhat rich mix, for example 12 to 1, yields more power than the theoretical chemical ratio 15.17 to 1. This is because the additional fuel introduces more chemical energy to the combustion chamber, and although the combustion is less complete, the net energy release is increased.

Further enrichment reduces the power output by decreasing the burning rate. The gasoline consumption in BTU (full power) of an automobile engine (230 BHP/5000 RPM).

Assuming gasoline quality of 21,000 BTU per pound, and since gasoline weighs 6.152 pounds per gallon, then $$6.152 \times 21,000 = 129,192 \text{ BTU per gallon}$$

and 21,000 BTU = $Q_h$ ∴ the power developed, calculated as 1 HP delivered continuously for one hour, is 2546.4 BTU; then $$\text{the brake thermal efficiency } BTE = \frac{2546.4}{bsfc \times Q_h}$$

since 1 HP = 2546.4 BTU/hour then $$230 BHP \times 2546.4 = 585672 \text{ BTU/hour}$$

or:

$$\frac{585672}{60} = 9761.2 \text{ BTU/min.}$$

Hydrogen required to replace gasoline.

Since, 1 cu.ft. $H_2$ (low net, 60° F., 1 ATM) = 287.306 BTU and since a 230 HP automobile engine requires 9761.2 BTU/min. for full power operation, then:

$$\frac{9761.2 \text{ BTU}}{287.306 \text{ BTU}} = 33.9749 \text{ cu.ft. } H_2 \text{ per min.}$$

Since one cubic foot $H_2$ requires 2.38 cubic feet of air for combustion, the air-fuel mixture is:

$$H_2 = 29.58\%$$

$$AIR = \frac{70.42\%}{100.00}$$

it follows, that the total volume of air-fuel mixture consumed per minute in the engine, is 114.8576 cu.ft. of which only 33.9749 cu.ft. is hydrogen which must be generated to support the theoretical requirements of the engine selected.

Since the overall system should be capable of providing additional capacity to cover the natural losses inherent in the insufficient automobile engine, the efficiency ($EFF_e$) of the said engine needs to be calculated.

$$\text{Engine Efficiency } EFF_e = \frac{4.325 \times 10^{-3} \times N_w \times T_w}{SCF/MIN H_2}$$

Where
Engine Efficiency = $EFF_e$
Engine RPM = $N_e$
Wheel Torque = $T_w$
Final Drive Ratio = FDR $$\text{Wheel RPM} = N_w = \frac{N_e}{FDR}$$

$$\text{Wheel H.P.} = HP_w = \frac{2\pi N_w T_w}{33000}$$

$$\text{Engine H.P.} = HP_e = \frac{2\pi N_e T_e}{33000}$$

$$HP_e = HP_w \times \frac{100}{\% \text{ Efficiency of Transmission}}$$

1 H.P. = 2545 BTU/hour or

= 42.417 BTU/min

1 SCF $H_2$ Generate 287.306 BTU

Thus the engine efficiency $$= \frac{HP_e \times 42.417}{SCF/MIN\ H_2 \times 287.306} \times 100$$

$$= \frac{HP_e \times 14.764}{SCF/MIN\ H_2}$$

$$= \frac{HP_w}{SCF/MIN\ H_2} \times 14.764 \times \frac{100}{TRANS.\ EFF.}$$

Transmission and peripheral power drains = 35%

$$\text{Engine Efficiency} \therefore = \frac{HP_w}{SCF/MIN\ H_2} \times 22.714$$

$$= \frac{2\pi N_w T_w}{33000 \times SCF/MIN\ H_2} = 22.714$$

$$= \frac{4.325 \times 10^{-3} N_w T_w}{SCF/MIN\ H_2}$$

Therefore, it follows if $T_w$ = 300 lb.ft. at 2600 engine RPM and the final drive ratio is 2.92 to 1 then:

$$N_w = \frac{2600}{2.92}$$

= 890.41

$$\therefore EFF_e = \frac{4.325 \times 10^{-3} \times 890.41 \times 300}{30.00}$$

= 38.51% or

100 − 38.51 = 61.49% Inefficiency.

It follows then, that the theoretical requirement of the system should be increased from 33.9794 cu.ft. $H_2$ per minute to 88.22 cu.ft. $H_2$/min. Therefore, the total volume of the air-fuel mixture consumed per minute will increase to 298.24 cu.ft./min.

Steam required for full power operation to produce hydrogen.
88.22 cu.ft. $H_2$ required per minute
648.0 grams steam produces 72.72 grams of $H_2$
∴ 8.911 grams of steam per gram of $H_2$.
$H_2$ = 0.00531 LB/cu.ft = 2.40863 grams/cu.ft. then 88.22 (cu.ft.)×2.408563 = 212.48342 grams $H_2$ and 212.4834 × 8.911 = 1893.4397 grams steam per minute or 4.1736 pounds of steam per minute.
Steam at 212° F. and 1 ATM weighs 0.0373 LB per cu.ft. (16.92 g).

$$\therefore \frac{4.1736\ LB/MIN}{0.0373\ LB\ cu/ft.} = 111.892\ cu./ft./min.\ \text{of steam at full power}.$$

It follows then if 88.22 cu/ft of $H_2$ consumed per minute, or that amount of fuel is burned with air, which is essential to provide the amount of oxygen required to support the combustion of the fuel, which when burned will produce 111.892 cu/ft of steam per minute at full power. Therefore, this amount of steam which is the only by-product of the combustion theoretically, can be regenerated, to produce the required $H_2$, however, it needs to be noted, that an additional quantity of 7–10% of steam needs to be added, to anticipate and correct for the practical losses which do in fact occur.

Figure 2:
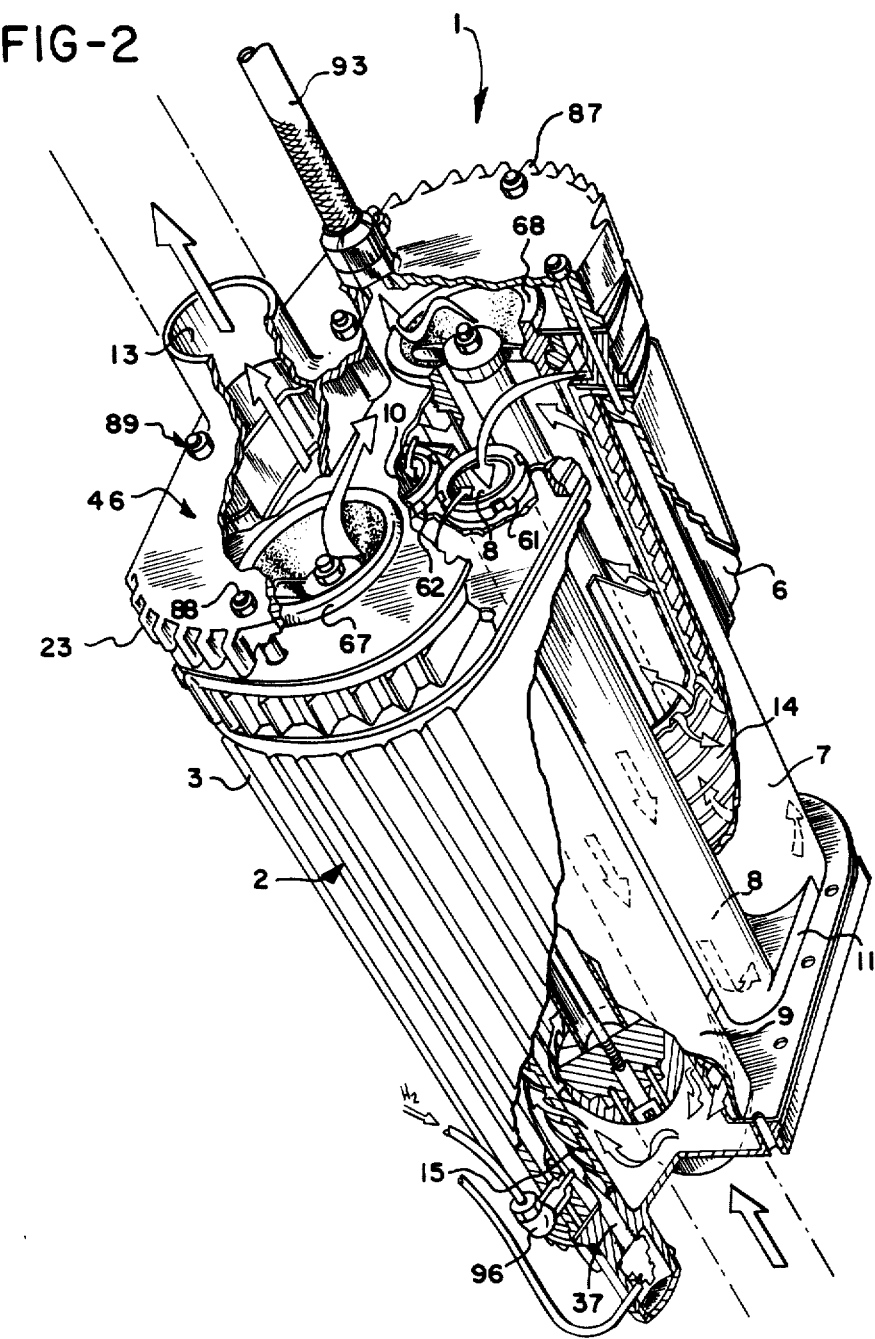
FIG. 2 is a perspective view of the apparatus embodiment of the invention, partially broken away for illustrative clarity.

With this consideration in mind, attention is now directed to FIG. 2 which is a perspective view of the apparatus embodiment, partially broken away for illustrative clarity, wherein the major components of the apparatus of the instant invention for use in an automobile are shown, the apparatus generally being designated by the numeral 1.

The construction of the apparatus 1 is fully illustrated by FIGS. 2 through 14. It comprises an elliptical main body casting 2 having a hollow core or tabular body. The main body 2 may be cast from aluminium, or any other suitable material in a manner well known in the art. The peripheral wall of the elliptical casting incorporates a number of longitudinal cooling fins 3 formed on both sides of the main body casting 2 and providing an enlarged surface area which in return will allow to dissipate excess heat, when it is so desired. In FIGS. 10, 11, 12, 13, and 14, four mounting pads numbered as 5 are shown, which are incorporated in the main body casting 2. The mounting pads 5 are tapped to provide a feasible means to secure the apparatus 1 to an automobile where it will replace the conventional muffler.

Furthermore, the main body casting 2 will surround a ceramic fibre embodiment, which is vacuum packed into the main body, where it will become a permanent heat insulator, and will provide a means to create the desired isolated system. Suitable materials for the ceramic heat insulator 6 are Morganite Ceramic Fibres or Triton Kaowool Ceramic Fibres, which being the preferred material.

It is also apparent in FIGS. 2, 3, 4, and 14, that into the heat insulator ceramic 6 two cylindrical sleeves are mounted and numbered as 7 and 9, forming two independent annular reaction chambers, which are interconnected with the corresponding return pipe 8 and 10 by the connecting chambers numbered as 11 and 12. The two cylindrical sleeves 7 and 9 with their respective return pipe 8 and 10 and the corresponding connecting chambers 11 and 12 together with a common exhaust means 13 is a prefabricated assembly, which may be manufactured by any suitable material, which is inert to the reaction and will withstand the temperature encountered in the apparatus 1. The preferred material is stainless steel. The two cylindrical sleeves 7 and 9 will provide two independent annular reaction chambers in the isolated embodiment, as well as a means to embody one of the required reactant tube's 14 and 15 respectively.

Figure 5:
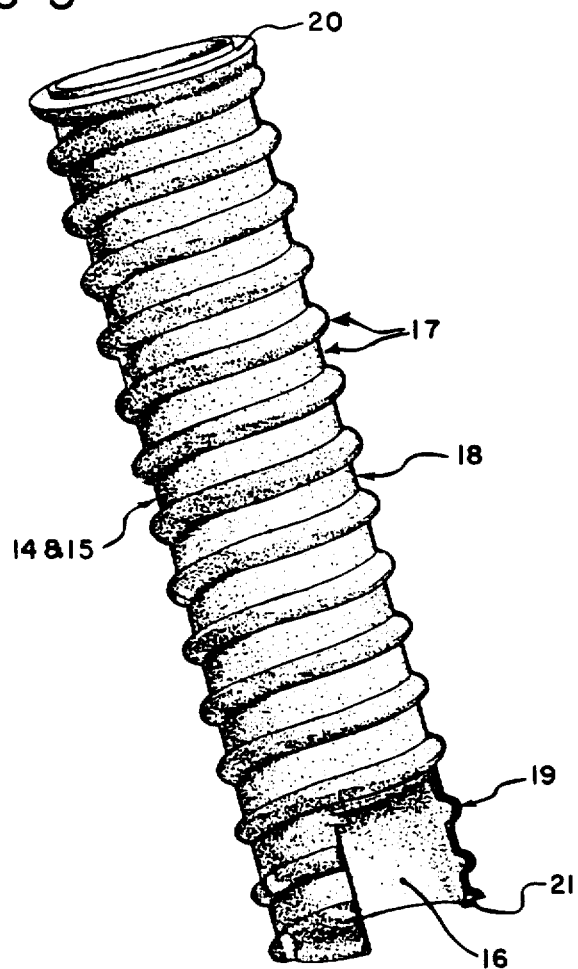
FIG. 5 is a perspective view of a metal reactant tube.

As seen most clearly in FIG. 5 which is a perspective of the reactant tube 14 and 15, which are identical, and comprising a metal or oxide thereof capable of displacing hydrogen continuously from superheated steam exothermically to form an oxide of said metal at a higher oxidation number being capable of dissociation or disproportionation spontaneously to release oxygen at a predetermined dissociation temperature in the absence of free oxygen. Furthermore, as shown in FIG. 5 the metal reactant or reactants are having a predetermined ratio in relation to the surface area of the input or upstream side marked as 16 and the output side of the reactant. The outer surface area marked as 17 of the metal reactant or catalyst 14 and 15, which represents the output side of the reactant (where oxygen is released) as shown in FIG. 5 having a helically formed groove 18. The thread like protrusion of the metal reactants 14 and 15 which is marked as 19, and whereas the upper part has a smooth radially formed periphery and begins with a closed loop, then extends through the length of the metal reactant 14 and on reaching the other end, where it will form a closed loop again. The helically formed groove 18 will provide a means to channel heat evenly around the catalyst, therefore, providing the required time cycle, which is lengthened as desired by the method defined previously and creates a feasible means to maintain a predetermined temperature differentiation between the input or upstream side marked as 16 and the output side of the reactant marked as 17. Furthermore, the metal reactant 14 will fit closely within the peripheral wall of the cylindrical sleeve 7 and 9, therefore, will provide the desired helically formed cavity or groove 18 where hydrogen is burned, which in turn will remove free oxygen as well as provide a means to quickly heat the metal reactant 14 and 15 to red heat. The metal reactant 14 and 15 in the meantime, will displace hydrogen by absorbing oxygen and when the predetermined dissociation temperature is reached, therefore, being capable to dissociate or disproportionate the said metal oxide spontaneously by doing so, a continuous operation can be and will be maintained. The released excess oxygen is removed continously through a common exhaust means 13. The input or upstream side 16 of the metal reactant 14 and 15 is machined in a manner that they will compensate for the inherent pressure drop which will occur during the reaction by displacing hydrogen continuously from the superheated steam exothermically and absorbing oxygen spontaneously. Therefore, the said pressure drop is eminent, to componsate for the inherent pressure drop, the cavity of the metal reactant 14 and 15 needs to form a cone like vessel where the beginning of the input side 16 is larger than the output end of the metal reactant. Therefore, the tube like catalyst will have a tapered bore, which in turn will progressively reduce the surface area between the input side of the metal reactant 14 and 15 and the permeable diffusion membrane assembly shown in FIG. 6 which will become more apparent as the description of the apparatus 1 proceeds. Therefore, if the metal reactants 14 and 15 are manufactered in the manner described the desired uniform pressure will be maintained. As stated before the metal reactants 14 and 15 need to be fitted closely within the periphery walls of the cylindrical sleeves 7 and 9 sharing a common centre line in relation to each reaction chamber. This requirement is achieved by the use of the two concentric cylindrical mounting flanges located on either end of the catalyst and numbered as 20 and 21 respectively, and are seen most clearly in FIG. 5 as mentioned earlier. The catalyst can be in various physical size, the quantity of metal required per catalyst can be determined by simple calculations, the main requirement being that maximum surface area of the catalyst be exposed to the superheated steam to provide a high reactant surface. It is noted that a pressure differentiation and heat differentiation between the input or upstream side 16 and the output side 17 of the metal reactant 14 and 15 must be maintained. A suitable material for the metal reactant 14 and 15 is iron. It is also noted that the metal reactant tubes are manufactured in the form of sleeves which can be replaced as needed.

Figure 4:
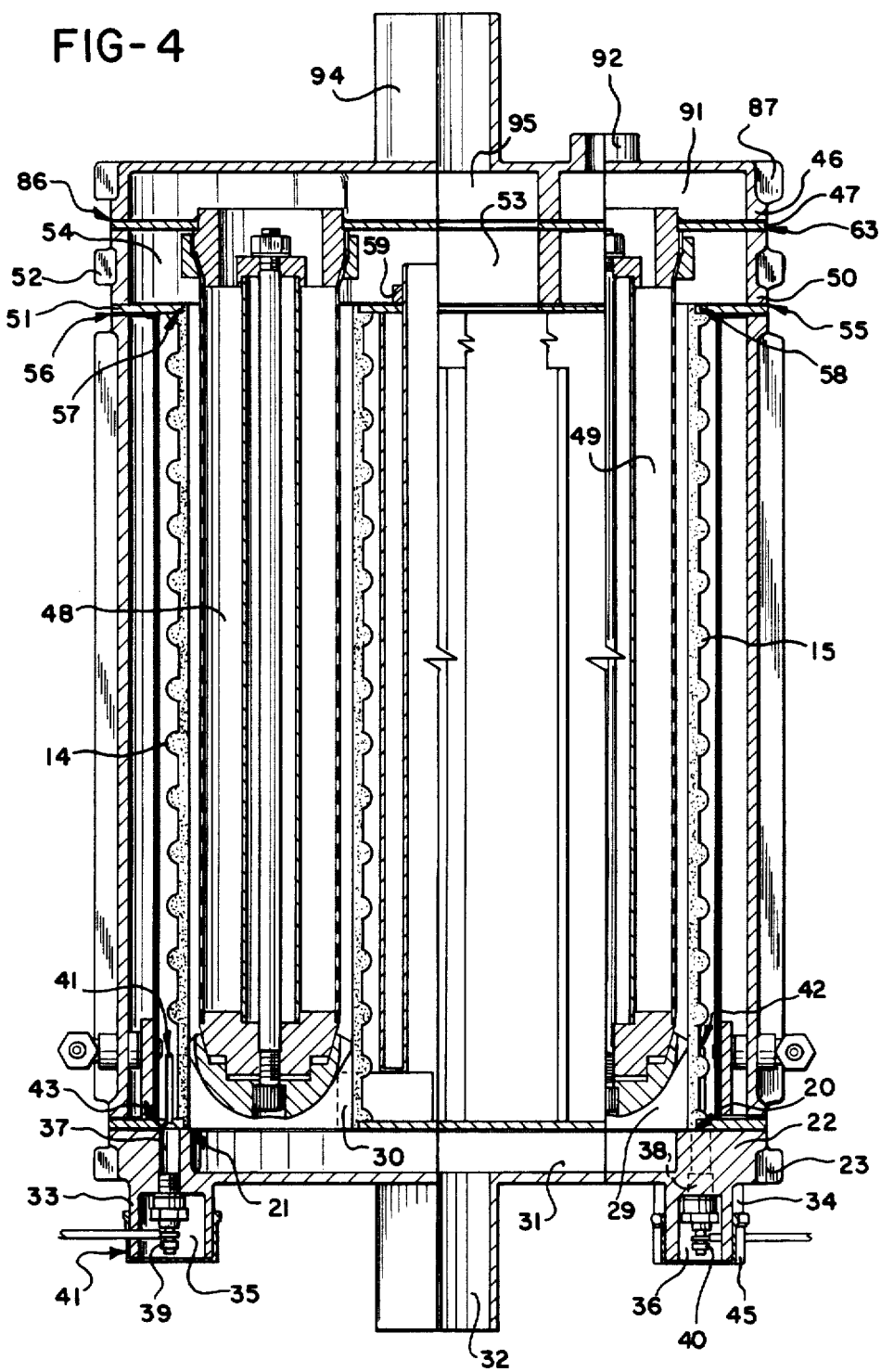
FIG. 4 is a horizontal cross-section view of the apparatus embodiment of the invention, taken on the line 4—4 of FIG. 12.
Figure 12:
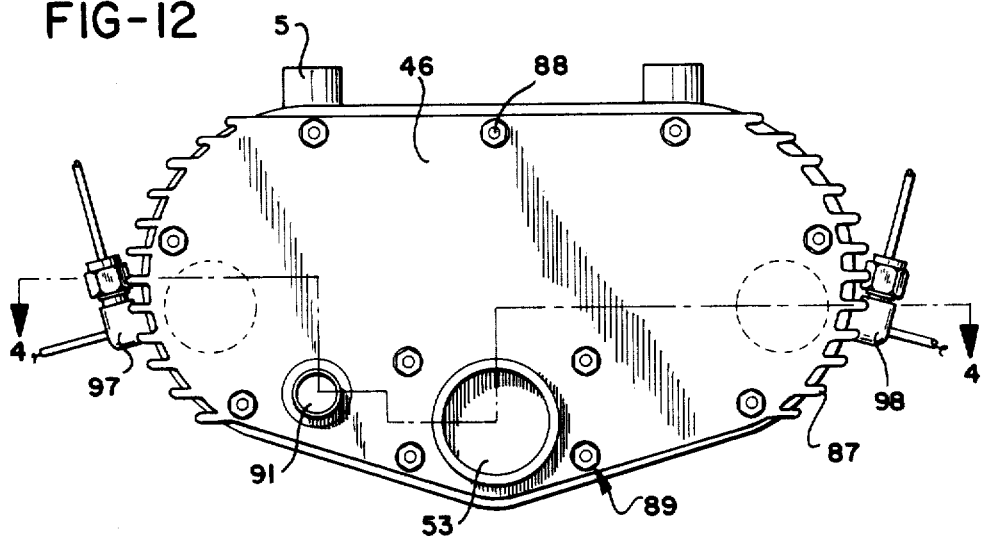
FIG. 12 is a rear elevation of the apparatus embodiment.
Figure 11:
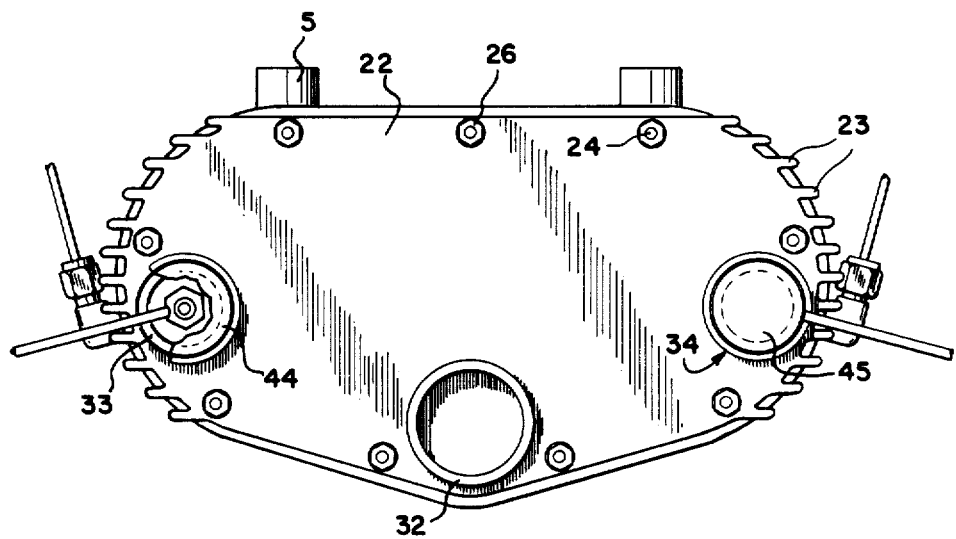
FIG. 11 is a front elevation of the apparatus embodiment.

The attention is now directed to FIG. 4 which is a horizontal cross-section of the apparatus 1 and taken on the line 4—4 of FIG. 12. FIG. 4 as well as 10, 11, 13, are clearly showing the construction of the apparatus. The input closure denoted generally as 22 and comprised of aluminium casting (BS1490-CM5). The peripheral wall of the casting incorporates cooling fins 23 which are formed as extensions of the fins described in conjunction with the main body casting 2. The input closure 22 is fastened to the input end of the main body casting 2 as shown most clearly in FIGS. 11, and 13. The nine studs 24 which are screwed into tapped holes in the main body casting 2 and the corresponding nuts 26 which are held firmly in position by nine external tooth lock washers 25, will provide a means of clamping the assembly firmly together.

The interface between the input closure 22 and the mounting plate 26 is sealed by an annealed copper gasket 27 which will take a shape indentical to those provided by the input closure 22.

The interface between the mounting plate 26 and the main body casting 2 is sealed by another annealed copper gasket numbered as 28 and will take a symmetrical shape to those of the mounting plate 26.

The mounting plate 26 is comprised of a carefully machined, parallel stainless steel plate, which needs to provide a perfect seal between the main body casting 2, which as mentioned before, surrounds the ceramic heat insulator 6, which further embodies the two independent annular reaction chambers 7 and 9 with their respective return pipes 8 and 10 as well as the corresponding connecting chambers 11 and 12. The mounting plate 26 does not only provide the required sealing affect inbetween the above mentioned embodiments and the input closure 22, but creates a near perfect seal around the required mounting holes 29 and 30 for the two independent reactant tubes 14 and 15, which are as mentioned before sharing a common centre line with the reaction chambers 7 and 9, therefore, the mounting holes 29 and 30 must be located on the same common centre line to provide the required location.

Furthermore, the mounting plate 26 will provide a suitable closure for the chamber 31 which is cast into the input closure 22 and allows an equal distribution of superheated steam between the reaction chambers 7 and 9. The distribution chamber 31 will receive superheated steam as required through a tubular input means numbered as 32, which is most clearly shown in FIGS. 4 and 11. The tubular input 32 in the case of the present application which as stated previously is the automobile engine, may be directly connected to the conventional exhaust system by a suitable flexible pipe.

The input closure 22 comprises of two raised tubular bodies 33 and 34, which have a cylindrical flat bottom cavity 35 and 36. The centre of these cavities 35 and 36 are providing a suitable clearance hole 37 and 38 with the threaded upper portion to suit a continuously rated sheeted element heater plug 39 and 40. The sheeted elements 41 and 42 of the heater plug 39 and 40 are permanently mounted into the body portion of the plugs at a point where they are forming a taper as indicated by the numeral 43. The taper portion of the heater plug 39 and 40 provides a suitable seal in conjunction with the matching tapered seat machined into the mounting plate 26. The sheeted elements 41 and 42 of the plugs which are protruding into a cavity formed by the cylindrical sleeve 7 and 9 and the reactant tubes 14 and 15, are heated to a temperature of 850° C. to 1050° C., and maintained at that temperature during the operation cycle of the device. This temperature is capable of igniting hydrogen in air and maintaining this process while the sheeted element heater plugs 39 and 40 are energised. The peripheral walls of the tubular bodies 33 and 34 are machined to provide a forced fit with matching end caps numbered as 44 and 45. The above mentioned end caps 44 and 45 are providing a means to enclose the sheeted element heater plugs 39 and 40 from the environmental effect which may be experienced in conjunction with a motor vehicle.

Figure 6:
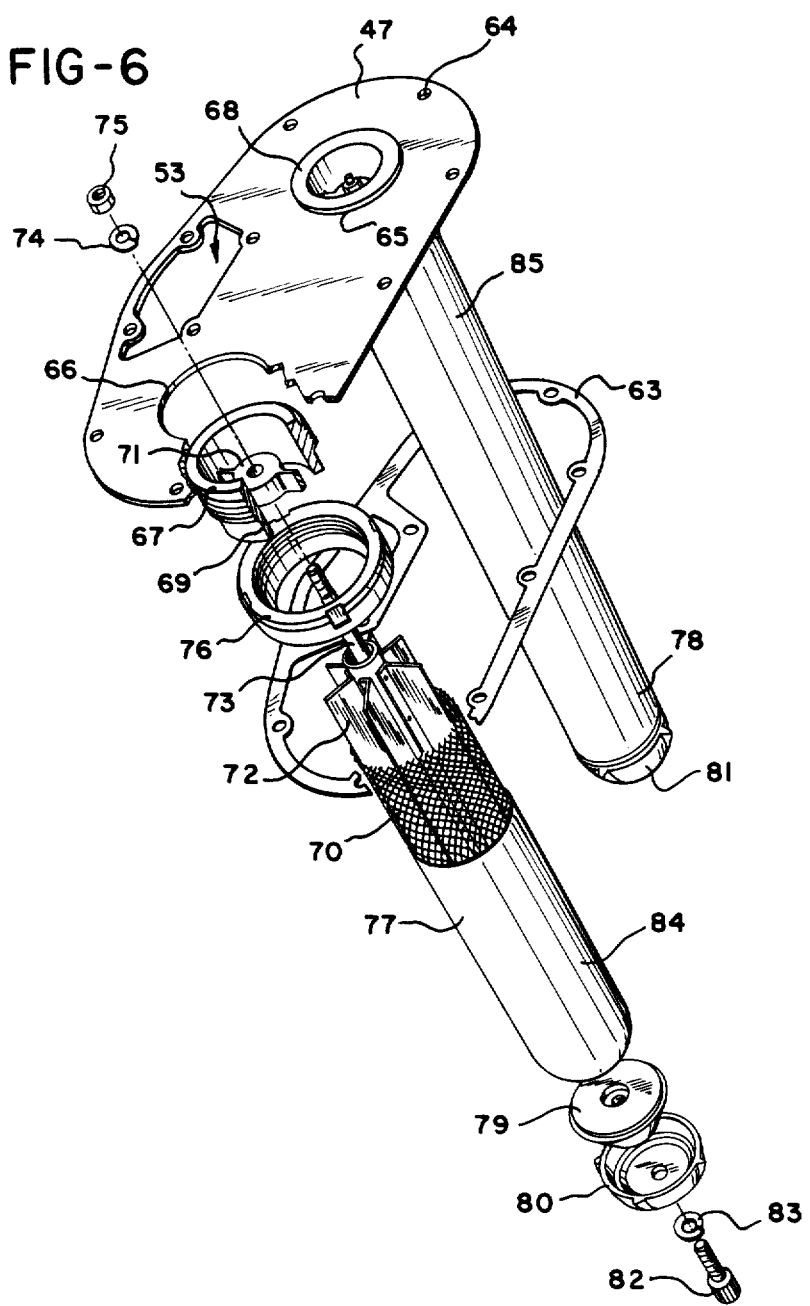
FIG. 6 is an exploded perspective view of the permeable diffusion membrane assembly broken away from the apparatus embodiment for illustrative clarity.

The output end of the apparatus 1 are comprising of an output closure 46, a base plate 47, which provides a permanent location for the permeable membrane assemblies 48 and 49, as shown in FIG. 6, and will be described below. The numeral 50 represents a spacer, which is followed by a mounting plate 51.

The spacer denoted generally as 50 comprises of an aluminium casting (BS1490-CM5). The peripheral wall of the casting incorporates cooling fins 52, which are formed as an extension of the fins mentioned before in conjunction with the main body casting 2. The spacer 50 provides eleven through holes for the purpose of mounting the spacer 50 to the main body casting tube as well as a large cavity which is separated by an internal wall and offers feasible means to remove through that cavity the inert non-polluting by-product created by the process, which as mentioned before, will produce hydrogen on demand. The cavity numbered as 53 needs to provide sufficient volume to ensure that there is no excessive pressure or restriction which will occur through the total range of the operation, while the remainder of the volume created by the peripheral wall, will provide a separate cavity denoted as 54 and which will interconnect the two chambers provided by the reactant tube 14 and 15, and by the two diffusion membrane assemblies 48 and 49 with the two return pipes 8 and 10, so that a required means to provide a continuous circulation of the superheated steam and by-product thereof, can be achieved.

The interface between the spacer 50 and the mounting plate 51 is sealed by an annealed copper gasket 55, which will take a shape identical to those provided by the spacer 50.

The interface between the mounting plate 51 and the main body casting 2, is sealed by another annealed copper gasket numbered as 56 and will take a symmetrical shape to those of the mounting plate 51.

The mounting plate 51 comprises of a carefully machined, parallel stainless steel plate, which will provide the required pressure against the copper gasket 56, therefore offering a means to seal the main body casting 2 as well as create a near perfect seal around the mounting holes 57 and 58, which are used to locate the reactant tubes 14 and 15. These mounting holes 57 and 58 are positioned in a manner that the holes will share a common centre line with the reaction chambers 7 and 9. The mounting plate 51 will further provide two mounting holes 59 and 60 more clearly shown in FIG. 14, which are in line with the return pipes 8 and 10. The said return pipes 8 and 10 are secured and sealed against the mounting plate 51 by two identical lock-nuts numbered as 61 and 62, and shown in FIG. 2. The mounting plate 51 will also provide an opening matched to the cavity 53 provided in the spacer 50 which allows the by-product of the reaction to be removed or exhausted. The mounting plate 51 will incorporate the required mounting holes which are symmetrical to those provided by the spacer 50.

The interface between the interbase plate 47 and the spacer 50 is sealed by an annealed copper gasket 63, which needs to take a shape identical to those provided by the spacer 50.

The base plate 47 will seal and separate the spacer 50 and the output closure 46 as well as providing a suitable opening 53 between those cavities which will allow the by-product to be exhausted. The main function of the base plate 47 is to provide a common base for the permeable membrane assembly 48 and 49. With this consideration in mind, attention is now directed to FIG. 6, which is an exploded perspective view of the permeable membrane assembly 48 and 49, broken away from the apparatus embodiment for illustrative clarity. The above mentioned assembly consists of two independent diffusion membrane sub-assemblies 48 and 49 and their common base plate 47. The base plate 47 is comprised of a carefully machined parallel stainless steel plate, which provides eleven true mounting holes 64, which are matching to those provided by the spacer 50. The two cylindrical mounting holes 65 and 66, which are sharing a common centre line with the reaction chambers 7 and 9, will provide the required location for the two membrane base locators 67 and 68.

The membrane base locators 67 and 68 comprise of a stainless steel cylindrical body with its raised threaded portion followed by a male tapered part 69 and a stepped cylindrical support, where one end of the support sleeve 70 will be force fitted. The upper end of the membrane base locator 67 and 68 provides a cylindrical locator allowing the component to be force fitted with the base plate 47 in a manner that its upper end will protrude the base plate 47, leaving sufficient area to unite the membrane base locator 67 and 68 to the common base plate 47 by a continuous air tight weld. As shown in FIG. 6, the centre of the membrane base locator 67 and 68 are bored out to a depth forming a tube like component, however, leaving a centre boss 71, which is joined to the tube like body by two rib like extensions of the circle boss 71, therefore, capable of providing a through flow of hydrogen as well as a suitable support. The boss 71 is counter bored to provide a suitable locator for the prefabricated support sleeve spacer 72, while the centre of the said base 71 is drilled and tapped through so that it will accommodate a threaded draw bar 73, which will be located firmly in position by a lock-washer 74 and a lock-nut 75.

The stainless steel lock-nut 76 having an internal thread on its upper end, which will match the thread provided by the membrane base locator 67 and 68, and having a female taper on its other end which will provide a means to secure the permeable diffusion membrane 77 and 78 in the required position, offering an air-tight seal which is more clearly shown in FIG. 4.

The support sleeve 70 comprises of a stainless steel mesh having 82% open area, therefore, having a line contact only with the permeable diffusion membrane 77 and 78, which will provide the required support to withstand the pressure differential created between the input and the output side of the membrane.

The support sleeve 70 will be held rigidly in position by the support sleeve spacer 72, which comprises of a stainless steel prefabricated assembly, having a tube like centre body and six fins which are equally spaced on its circumference and held there by spot weld. The outer edge of the assembly needs to be concentric to the outer peripheral of the tube like centre body which in return will provide a means to ensure that the permeable membrane assembly 48 and 49 will share a common centre with those provided by the reaction chambers 7 and 9. The input end of the assembly consists of a spacer 79, a cup like locator 80 and 81, which are held together by a socket head screw 82 and locked in position by the lock-washer 83.

The spacer 79 comprises of a stainless steel cylindrical body. The centre of the spacer 79 will provide an internally threaded hole to suit the threaded stainless steel draw bar 73, as well as the socket head screw 82. The inner end of the hole is enlarged to provide a suitable location for the support sleeve spacer 72. The outer peripheral of the spacer is under-cut on its inner end, to accommodate the support sleeve 70 while the other end will provide a male taper which is further reduced to provide a cylindrical boss, which in turn acts as a suitable support for the cup like locator 80 and 81, as shown in FIG. 4.

The locator 80 and 81 which comprises of stainless steel and its inner end hollowed out, so that it will provide a female tapered cavity which is further reduced to accommodate the cylindrical locator of the spacer 79. The locator will furthermore, provide a true hole which is counter bored to suit the socket head screw 82. The spherical outer shape of the locator 80 and 81, provides four fins which will support the assembly in the reactant tubes 14 and 15, by having a close fit to the bores of the said tubes. The function of the spacer 79 and the cup like locator 80 and 81 is not only to provide the required support but to seal the permeable diffusion membrane 77 and 78 inbetween the tapered faces, which will not only provide an air-tight seal, but will hold the said membranes in permanent position, as well as provide a means to replace the said membranes if and when it is so required.

The permeable diffusion membranes 77 and 78 comprise of palladium-silver alloys, where the content of the silver is in the region of 24%. The tube like membranes having a wall thickness of 0.004 to 0.005 inches will be capable of decomposing superheated steam in a predetermined ratio to the quantity produced by the metal reactant 14 and 15, therefore, they will assist the said metal reactant in the diffusion of hydrogen, as well as providing a means to remove hydrogen from the reactant chambers in a continuous manner. The permeation rate which largely depends on the surface area, thickness, temperature, and the pressure differential between input and output faces can be and has been calculated as it has been explained in the prior text, however, this rate may be further improved by maintaining a continuous movement at the entry side of the membranes as well as insuring an improved activation procedure whereby a defined portion of the surface area of the permeable diffusion membranes 77 and 78 are in contact with material such as copper. FIG. 6 clearly indicates that these activation procedures have been implimented by plating the membranes with copper on a defined surface area having a thickness not more than 0.0005 inches. The copper plated area is denoted by the numerals 84 and 85.

The interface between the base plate 47 and the output closure 46 is sealed by another annealed copper gasket numbered as 86, and it will take a shape symmetrical to those of the output closure 46.

The output closure 46 shown in FIGS. 2, 4, as well as 10, 12, and 13, which is comprising of an alluminium casting (BS1490-CM5). The peripheral wall of the casting incorporates cooling fins 87 which are formed as an extension of the fins described with the main body casting 2. The output closure 46 is fastened to the output end of the main body casting 2, providing a means to secure the base plate 47, the spacer 50, the mounting plate 51, in the position defined earlier as well as applying the required pressure to provide the sealing effect needed between the faces which are interfaced with suitable gaskets as stated before. The eleven studs 88 shown in FIG. 12 and 13, are screwed into tapped holes in the main body casting 2, and the corresponding nuts 89 which are firmly locked in position by eleven external tooth lock-washers 90, will provide the required means of clamping the assembly together. The base plate 47, which will separate as well as seal one side of the output closure 46 will allow a feasible means to create two independent cavities, one of which will join the two permeable diffusion membrane assemblies 48 and 49, therefore, providing a common hydrogen chamber 91, as well as a means to remove hydrogen thereof, through an outlet means which consists of a cylindrical boss 92, which is internally threaded to accept a flexible pipe and its associated fittings 93. The tubular output 94 which is forming a part of the output closure 46 and enters into a separated chamber 95 and will provide a further means to remove the by-product of the process through the said chamber 95 and through the tubular output 94 by connecting the said output to the conventional exhaust system of the automobile, which of course is applicable only in the case of the present application.

One of the requirements to achieve the process set-forth, is to heat the output side of the metal reactant 14 and 15, in a manner that, a predetermined temperature differentiation is maintained inbetween the input or upstream side and the output side of the said reactant. It is a further requirement to provide a means to maintain this temperature at a level where it will displace hydrogen from super-heated steam. It is yet another requirement to raise the temperature of the output face of the metal reactant 14 and 15 to a predetermined dissociation temperature where it will release oxygen in the absence of free-oxygen. Of course, there is a practical aspect which dictates what method will be useful in the present application, what practical approach will provide the temperature at which the metal will displace hydrogen from super-heated steam exothermically and provide the temperature at which the metal oxide will dissociate, disproportionate, spontaneously. Reduction of iron oxide using hydrogen is a well known fact, that is, iron oxide can be reduced with hydrogen when the $Fe_2O_3$ is heated in an atmosphere consisting of this gas. Furthermore, it has been found that the temperature above 750° C., iron oxide has an increasing tendency to dissociate, and it will do so. Therefore, if the system is isolated from the environmental surrounds and the small but controlled quantity of hydrogen is used inconjunction with a chemical burn the result will be as follows:

When the iron oxide is heated in the presence of hydrogen, which will be used to provide the chemical burn referred to, a small quantity of iron oxide will infact dissociate in a ratio well known in the art, in the presence of the said hydrogen. It has been stated earlier in the text, that the system is isolated therefore, a carefully metered and predetermined quantity of hydrogen will indeed be capable of raising the temperature of the metal reactants 14 and 15 on its outer face, to a level where the iron oxide will dissociate or disproportionate, or more simply to a point, where the oxidisation number is lowered and the action can be continuous without lessening the action or the reaction.

Figure 9:
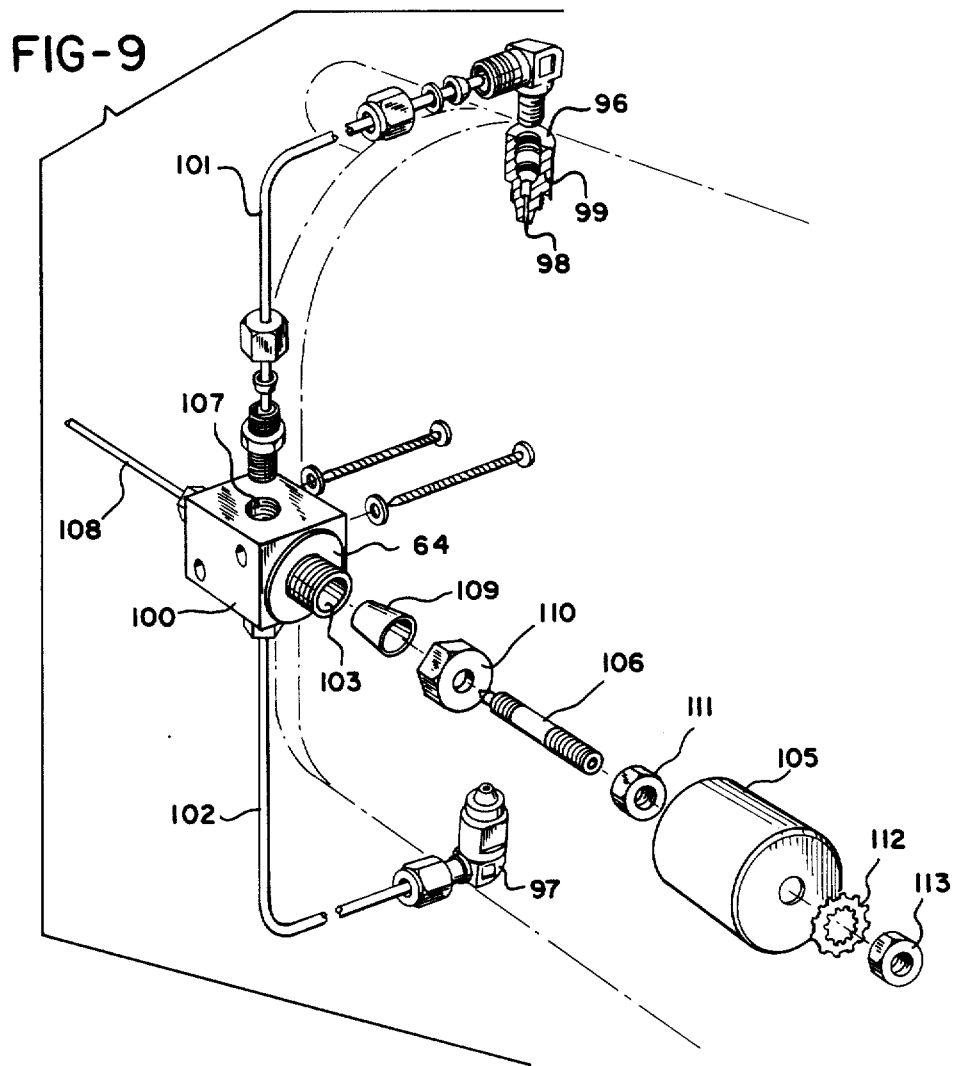
FIG. 9 is an exploded perspective of the gas metering valve and pilot burner assembly.
Figure 10:
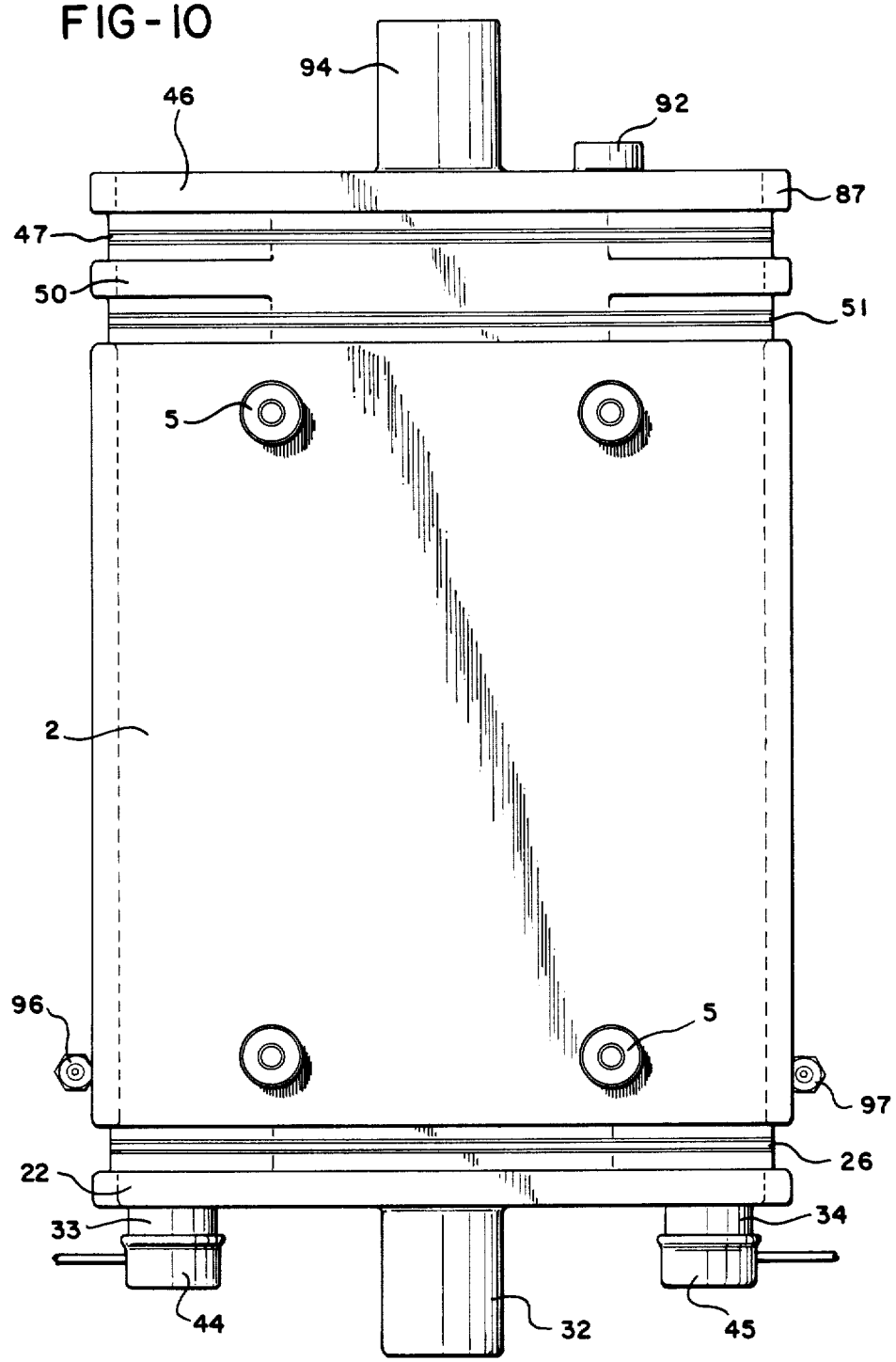
FIG. 10 is a plan view of the apparatus embodiment of the invention.

The design of the apparatus 1 will provide a means to fulfill the requirement setforth by injecting hydrogen into the cavities formed by the metal reactants 14 and 15, and the corresponding sleeves 7 and 9, through the pilot burners 96 and 97, which are clearly shown in FIG. 2 and 9.

The pilot burners 96 and 97 comprises of a stainless steel cylindrical body. One end of the said body, which will penetrate into the cavity described above, is reduced to form a smaller threaded diameter then the cylindrical body, leaving a flat circular flange, which will provide the required sealing and control the penetration of the pilot burners 96 and 97 into the said cavities. The threaded portion of the burners are reduced further as shown in FIG. 9, to form a cone like tip, which will have a small orifice 98 which are lined with tungsten, and located in the centre of the pilot burners 96 and 97. This orifice enters into a larger hole, which connects the orifice 98 to a flat bottom internal hole 99, which in turn will provide a means to connect the pilot burners 96 and 97 to the metering valve assembly denoted as 100 by the two hydrogen supply pipes and their associated fittings 101 and 102.

The tube like body of the metering valve 100, which comprises of a rust protected mild steel and having on its front face a cylindrical threaded boss 103 positioned on the centre of a circle step 104 which will offer a suitable location for a mild steel protective cap 105. The centre of the said boss 103 is hollowed out in a manner that it will provide a tapered hole with its larger diameter being at the beginning of the hole and reducing it until it will reach the flat bottom of the said hole, which then further reduces, providing a smaller threaded hole, which will produce a means to accommodate the fine threaded portion of the stainless steel needle valve 106, which is positioned near to its inner, or cone like needle end. The said threaded hole will penetrate into a cross hole 107, which is threaded on its outer ends to suit the associated fittings 101 and 102, used to join the pilot burners 96 and 97 by the hydrogen supply pipes. Opposite to the penetration of the threaded hole which accommodates the needle valve 106, and on a common centre line, an orifice is located providing a suitable seat for the said needle valve 106. This orifice will enter into a larger flat bottom hole, which is threaded to match the hydrogen input line and its fittings 108. When the needle valve 106 is screwed into its desired position, and meters the quantity of gas required to sustain the process described previously, and surrounded by a tapered packing seal 109, which is comprised of Teflon the squeeze nut 110 is then screwed onto the threaded boss 103, which is threaded to suit the said squeeze nut 110, to a point where it will create sufficient pressure to force the packing seal 109 around the needle valves 106, offering a means to seal the hydrogen gas, which is as known, not easily manageable. A lock-nut 111 maybe used to secure the setting of the valve assembly, followed by the proective cap 105, which in turn is held in position by a lock-washer 112 and lock-nut 113 screwed onto the needle valve 106.

The description setforth has described a means to produce an apparatus denoted as 1, which, will function in accordance with the methods defined previously in relation to the present application. In order that the apparatus and the auxilliary equipment required, to maintain the desired function, it needs to be more fully explained, therefore, attention should be directed to FIG. 7.

Figure 7:
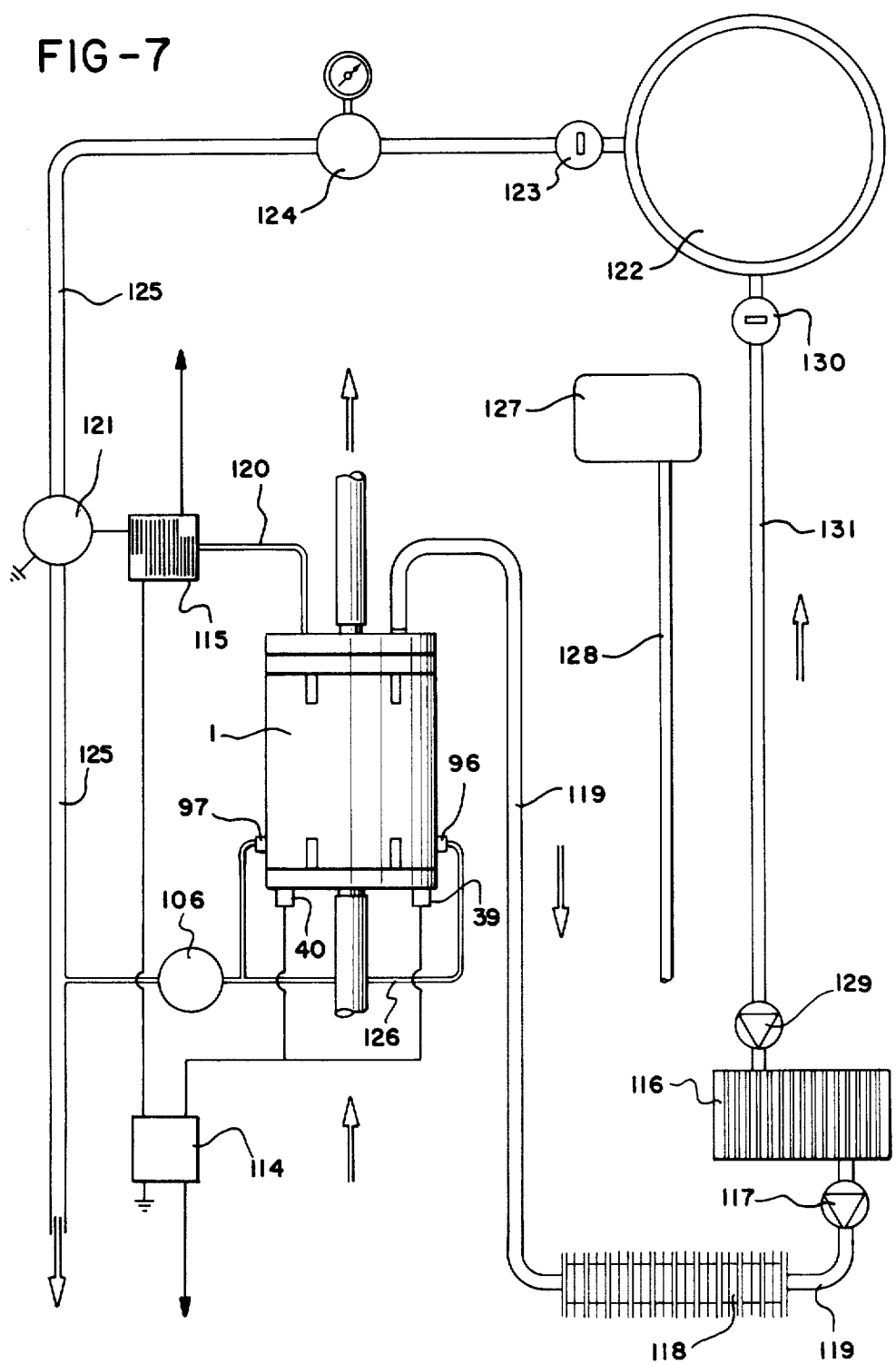
FIG. 7 is a diagrammatic view of the apparatus and related auxiliary embodiments.
Figure 8:
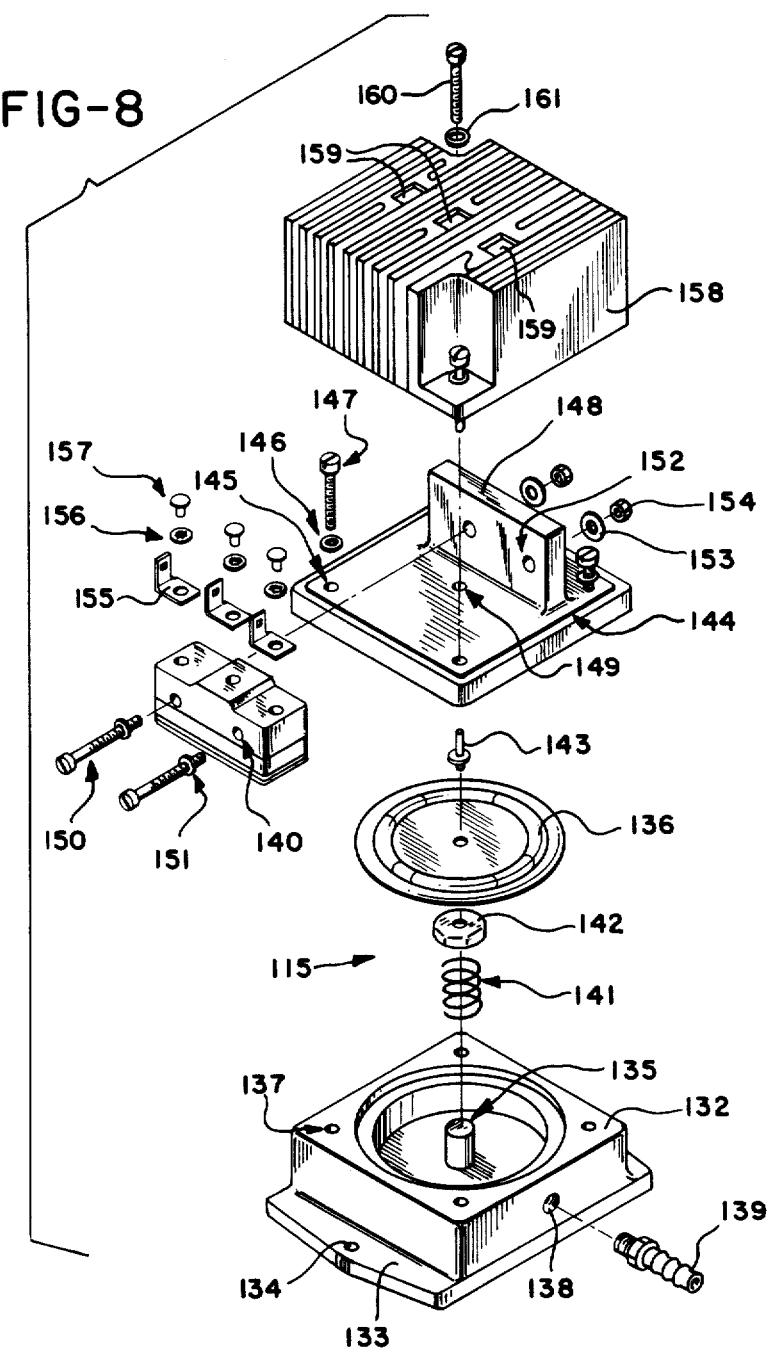
FIG. 8 is an exploded perspective view of a vacuum activated switch assembly.

FIG. 7 is a diagrammatic view of the apparatus, and the related auxilliary embodiments which maybe used in a conventional automobile, when hydrogen is the preferred fuel, which in turn is derived from water. To initiate the process the ignition key needs to be turned to "on" position which then will send a signal to energise a relay 114, which is permanently connected to a 12 V.D.C. power supply (battery). Upon energising the said relay 114, the sheeted heater elements 39 and 40 will become operative, which means that the temperature of the said plugs will raise to a level where they become capable to ignite and maintain a chemical burn of hydrogen. At the same time relay 114 will provide currents to the vacuum switch 115 which embodies a change-over switching arrangement and at that position allows the current to energise a warning light, which indicates that the apparatus 1 is on stand-by, and its heater plugs are energised. The ignition key is then turned to the start position, and the engine is cranked, therefore, providing a means to drive a specially designed, and constructed hydrogen pump 116, which is through a one-way valve 117, connected to a gas cooler 118 by a suitable pipe line 119, which continues on the opposite side of the gas cooler, and joining the apparatus 1 to the said pump 116. The hydrogen pump 116 is so designed, that it is capable of creating and maintaining a pressure not less than five inches of mercury on its input side. Obviously this pressure needs to be maintained within the cavities provided by the permeable diffusion membranes 77 and 78, and their associated passage ways, which are required to remove the hydrogen produced by the apparatus referred to, when the system becomes operative. As shown in FIG. 6 the cavities referred to above are connected to the vacuum switch 115 by a suitable pipe 120, therefore it will be activated and kept in that position while the pressure is within the required five inches of mercury. The said vacuum switch 115 is a vital and intricate part of the system, providing the required safety, therefore, a means to start, or stop the system if the required safety limit is not maintained. Due to the vital role of the vacuum switch 115 a more detailed description of its construction will be provided, which is shown in FIG. 8. As stated before, the vacuum switch 115 is now activated so that the switch which is embodied in it, will now change position, therefore, it will deactivate the warning light, and allow the current to proceed to a solenoid operated valve 121, which when energised, will initiate and maintain the flow of hydrogen, while it is kept in this position. The buffer tank 122 will then be connected which holds the initial quantity of hydrogen required to start an internal combustion engine, as well as, the required gas to heat the metal reactants 14 and 15. The said hydrogen which is pressurised to 150 P.S.I., will then flow through a manual switch 123, which obviously needs to be in an open position, then through a pressure regulator 124, which reduces the line pressure to 60 P.S.I., and which is equipped with a pressure gauge and connected to the solonoid operated valve 121, by a suitable pipe numbered as 125. The solonoid operated valve 121, then allows (because it is now activated), the hydrogen to pass through and flow direct to the fuel supply apparatus of the engine, as well as, supply the required quantity of hydrogen through the needle valve 100, which in return will control the required quantity, and proceed further through the associated pipes 126 which will allow the gas to flow through the pilot burners 96 and 97 into a cavity where it will be ignited by the red hot sheeted heater elements 39 and 40. As stated before, the engine is now cranked, the fuel is now available, the apparatus 1 has been heated, and the required vacuum is maintained, therefore, the engine now can be started, and when this is achieved and the ignition key is turned back to "on" position, the process will be sustained, and by achieving this, the required superheated steam will be produced, which is as known, the by-product of the hydrogen combustion, and further enlarged by the use of a predetermined quantity of distilled water, which is the preferred fuel, and stored in a small plastic tank 127, and injected into the combustion chamber of the engine through the suitable pipe lines and control means 128, where it will be converted to superheated steam. The said superheated steam then will be used to produce hydrogen as it will be described inconjunction with FIG. 3. By maintaining the required pressure in apparatus 1 by the continuous operation of the pump 116, the hydrogen produced will be removed from the said apparatus 1, and will be pumped through the means already described, into the buffer tank 122, through a one-way valve 129, and through a manual shut-off valve 130, which is connected by a suitable pipe line 131. Therefore, the cycle is completed, the hydrogen used is replaced and the operation can be sustained until the ignition key is turned to "off" position, therefore, the engine is stopped, the vacuum required is no longer available to activate the change-over switch, which then denergises the solonoid operative valve 121, and close the buffer tank, allowing it to retain sufficient quantity of hydrogen to start the cycle again, if and when it is so required.

FIG. 8 is an exploded perspective view of the vacuum activated switch assembly, generally denoted as 115, and as stated before, it will be now described. The vacuum activated switch 115 comprises of a cast aluminium base 132, which provides two mounting flanges 133, located on its lower edge as shown. The centre of the said flanges 133 provides two mounting holes 134, which may be used to secure the device to a suitable position. The square body of the base 132 is hollowed out in a manner that it will provide a centre boss 135 which is surrounded by a cylindrical cavity, which is then further enlarged, and offering a suitable location for the vacuum switch diaphragm 136. Number 137 represents four threaded mounting holes positioned on the top face and offering a means to hold the assembly firmly together. The threaded hole 138 which is positioned on the front face of the cast base 132, and penetrating through its wall, will accommodate a vacuum hole and its fittings 139, which is connected to apparatus 1, and provides a means to deactivate a micro-switch numbered as 140. The said micro-switch 140 is activated by a carefully preloaded spring 141, which is supported by the centre boss 135, allowing sufficient clearance so that the spring 141 will be capable of moving freely. The upper end of the spring 141 will enter into a cup-like spring retainer 142, which is positioned on the centre of the diaphragm, and held there providing an air-tight seal, by a shouldered activating pin 143, which will pass through a suitable hole located in the centre of the diaphragm 136, and through the centre of the spring retainer 142, where it will be swaged or riveted over, therefore providing an air-tight assembly. The disc-like diaphragm 136 which is comprised of a silicon impregnated glass fibre material having a gasket bonded to its outer edge, hollowed towards the centre by a spherical groove, which allows sufficient movement without over stretching the said diaphragm 136, therefore it will be capable to seal hydrogen which may enter in this cavity. The mounting flange 144 which comprises of an aluminium casting and provides the sufficient pressure against the outer edge of the diaphragm 136, therefore, keeping it in a perfectly sealed position by the cylindrical boss located beneath the square flange. The said square flange provides four mounting holes 145, out of which two are used to secure the mounting flange 144 to the cast base 132 by a spring-washer 146, and by a suitable screw 147. The mounting flange 144 will further provide a vertical base 148 which is positioned in a manner that it will allow the activator plunger of the micro-switch 140, when it is mounted against the vertical base 148 to line up, and rest on the activating pin 143, which is located by a hole 149 positioned in the centre of the said mounting flange 144. The micro-switch 140 will be secured against the said vertical base 148, by two screws 150, and spring-washers 151. These screws will pass through the holes 152 and will be locked in position by suitable spring-washers 153 and by the lock-nuts 154. At this position the micro-switch 140 is activated by the pressure applied against it from the preloaded spring 141, therefore, the current will pass through its normally opened contacts which may be connected to the required circuitry by the terminal 155, which is in turn secured to the microswitch 140 by suitable spring-washers 156 and suitable screws 157. However, upon the application of a suitable suction against the diaphragm 136, which will collapse the spring 141 then the micro-switch 140 will be deactivated and the current therefore will proceed through its normally closed contacts. The mounting flange 144, the micro-switch 140, with its associated assembly, will be protected against the environmental surrounds by a moulded plastic cover 158, which is clearly illustrated in FIG. 8, and providing suitable openings 159 for the terminals 155. The said cover is secured to the mounting flange 144 by two screws 160 which are locked in position by two spring-washers 161, therefore providing a highly sensitive fully enclosed assembly, which as stated is required to maintain the desired safety and operation of the apparatus in question.

Figure 3:
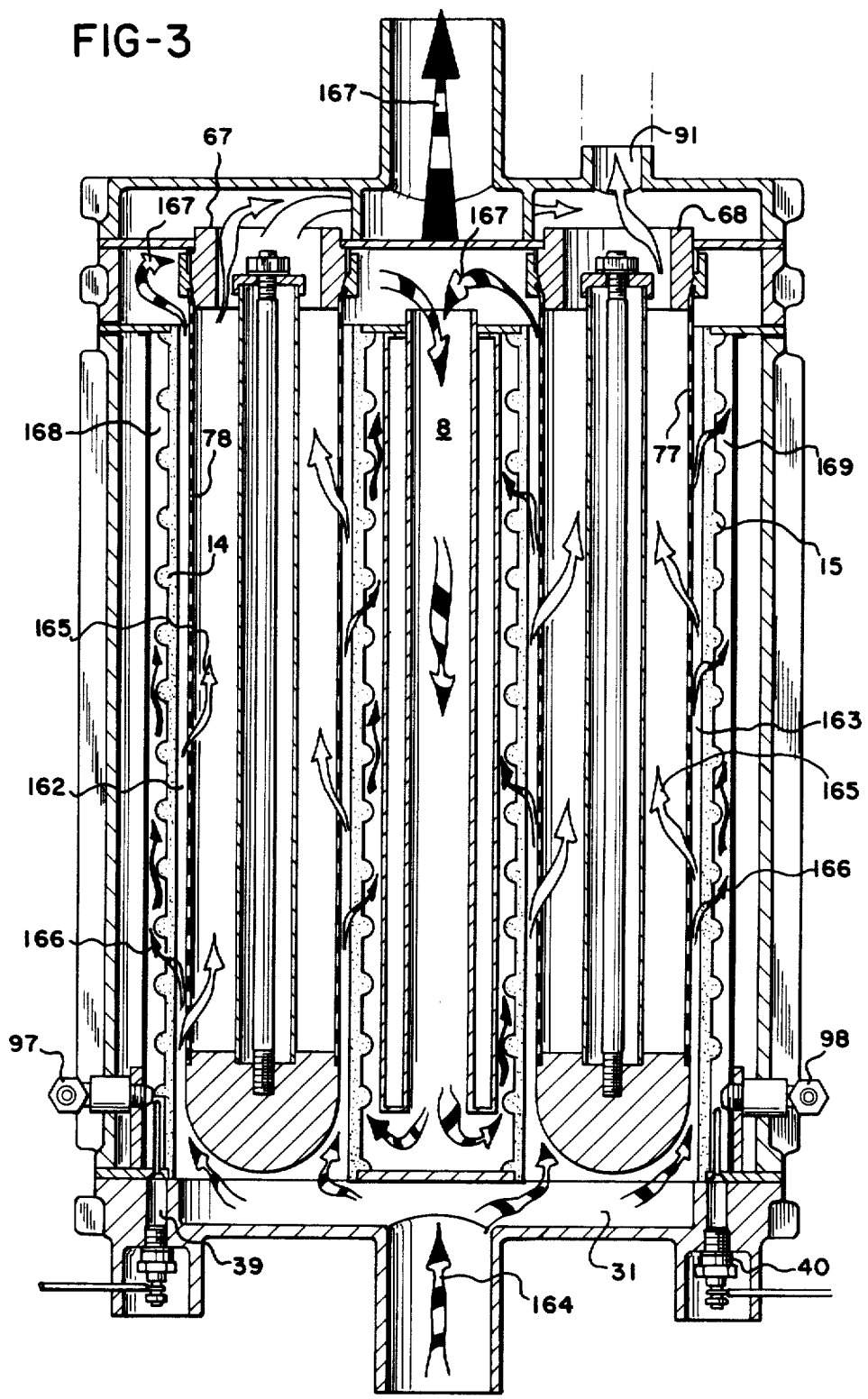
FIG. 3 is a schematic representation of the steam and hydrogen flow thereof, through the apparatus.

Turning to the said embodiment of the apparatus 1, attention is directed to FIG. 3, wherein, there is a schematic representation of the steam and hydrogen flow thereof, through the apparatus which is clearly visible. In this unit there are two reaction chambers 162 and 163, formed by a pair concentrically arranged metal reactant tubes 14 and 15, and a pair of permeable diffusion membranes 77 and 78. The tubes are held in place by the end closures and the associated mounting and base plates. Each of the reaction chambers 162 and 163 are charged with superheated steam, which is denoted by the numeral 164, and enters through the inlet into a chamber 31 where it will be equally divided and transferred into the said reaction chambers under pressure. As stated before the superheated steam 164 upon entry into the reaction chambers, will partially dissociate due to the catalytic reaction of the palladium membranes, which will allow the hydrogen numbered as 165 to pass through the metal film. The amount of oxygen 166 which has been liberated by the above mentioned reaction will be partially absorbed by the metal reactants 14 and 15, while the remainder together with other by-products 167 will proceed into a chamber which is connected by the two return pipes 8 and 10, through the deoxidising chamber 168 and 169. It has been also stated that the metal reactants 14 and 15 are heated by the chemical burn of a predetermined quantity of hydrogen which enters the said deoxidising chambers 168 and 169 through the pilot burners 97 and 98 and will be ignited by the sheeted heater elements 39 and 40, therefore, the read hot metal reactants 14 and 15 will split the remainder of the superheated steam 164 as well known, by absorbing the oxygen which then allows the liberated hydrogen 165, (created by this reaction), to be defused by the permeable diffusion membranes 77 and 78. The hydrogen 165 produced by the two reactions described above will be drawn away from the diffusion membrane assembly continuously through the hydrogen collection chamber 91, therefore the required pressure which is not greater than five inches of mercury, can be maintained which then offers a means to ensure that the required pressure differentiation between the entry and the exit surfaces of the diffusion membranes will be achieved in a unique manner. During the same time or simultaneously, the metal reactants 14 and 15 or the oxidising iron tubes are heated in the presence of hydrogen, which is used to provide the chemical burn referred to, therefore, the temperature of the metal reactants 14 and 15 on their outer face will rise to a level where the iron oxide will dissociate or disproportionate so that the action and the reaction can occur simultaneously, provided that the by-product of the reactions is removed continuously, which can be easily achieved by the use of the conventional exhaust system.

Accordingly, when an apparatus constructed as described, and having a reactant comprising of a metal or oxide thereof capable of displacing hydrogen continuously from superheated steam, exothermically to form an oxide of the said metal at a higher oxidisation number and the said metal oxide being capable of dissociation or disproportional spontaneously to release oxygen in addition to a permeable diffusion membrane such as palladium or its alloys, which are capable of decomposing superheated steam in a predetermined ratio to the quantity produced by the reactants, as well as providing a means to remove hydrogen from the reaction chambers in a continuous manner, then the object of the present invention can be obtained. Therefore, hydrogen can be produced on demand, however, it is to be distinctly understood that the embodiments setforth may be suitably modified for use in a number of different applications, therefore, it is not restricted to the present apparatus.

TABLE 1.1

HEAT OF FORMATION (coefficients: free energy equations)
A. The $\Delta H_0$ values are in gram-calories per mole
B. The a, b, and I values listed here can be used to calculate the $\Delta G$, and $\Delta S$ values by using the following equations:

$\Delta G_f = \Delta H_0 + 2.303_a T \log T + b \times 10^{-3}T^2 + c \times 10^5 T + 1 T$   Reference: Bulletin 542 Bureau of Mines U.S.A.

$\Delta S_f = -a - 2.303_a \log T - 2b \times 10^{-3}T + c \times 10^5 T^{-2} - 1$

| Reaction and Temperature range of validity | $\Delta H_0$ | $2.303_a$ | b | c | 1 |
|---|---|---|---|---|---|
| $H_2$ (g) + ½ $O_2$ (g) = $H_2O$(l) (298.16°–373.16° K.) | −70,600 | −18.26 | −0.64 | −0.08 | −8.74 |
| $H_2$ (g) + ½ $O_2$ (g) = $H_2O$(g) (298.16°–2,000° K.) | −56,930 | +6.75 | | | +93.59 |
| IRON | | | | | |
| 0.947 $Fe(\alpha)$ + ½ $O_2$ (g) = $Fe_{0.947}O$(c) (298.16°–1,033° K.) | −65,320 | −11.26 | +2.61 | +0.44 | +48.60 |
| 0.947 $Fe(\beta)$ + ½ $O_2$ (g) = $Fe_{0.947}O$(c) (1,033°–1,179° K.) | −62,380 | +4.08 | −0.75 | −0.235 | +3.00 |
| 0.947 $Fe(\gamma)$ + ½ $O_2$ (g) = $Fe_{0.947}O$(c) (1,179°–1,650° K.) | −64,750 | −8.04 | +0.67 | −0.10 | +42.28 |
| 0.947 $Fe(\gamma)$ + ½ $O_2$ (g) = $Fe_{0.947}O$(l) (1,650°–1,674° K.) | −64,200 | −18.72 | +1.67 | −0.10 | +73.45 |
| 0.947 $Fe(\delta)$ + ½ $O_2$(g) = $Fe_{0.947}O$(l) (1,674°–1,803° K.) | −59,650 | −6.84 | +0.25 | −0.10 | +34.81 |
| 0.947 $Fe(l)$ + ½ $O_2$ (g) = $Fe_{0.947}O$(l) (1,803°–2,000° K.) | −63,660 | −7.48 | +0.25 | −0.10 | +39.12 |

TABLE 1.2

| Reaction and Temperature range of validity | $\Delta H_0$ | $2.303_a$ | b | c | 1 |
|---|---|---|---|---|---|
| MAGNETITE (Iron) | | | | | |
| $3Fe(\alpha)$ + 2 $O_2$ (g) = $Fe_3O_4$ ($\beta$) (900°–1,033° K.) | −272,300 | −54.27 | +11.65 | +0.245 | +233.52 |
| $3Fe(\beta)$ + 2 $O_2$ (g) = $Fe_3O_4$ ($\beta$) (1,033°–1,179° K.) | −262,990 | −5.71 | +1.00 | −0.40 | +89.19 |
| $3Fe(\gamma)$ + 2 $O_2$ (g) = $Fe_3O_4$ ($\beta$) (1,179°–1,674° K.) | −276,990 | −44.05 | +5.50 | −0.40 | +213.52 |
| $3Fe(\delta)$ + 2 $O_2$ (g) = $Fe_3O_4$ ($\beta$) (1,674°–1,803° K.) | −262,560 | −6.40 | +1.00 | −0.40 | +91.05 |
| IRON | | | | | |
| $3Fe(l)$ + 2 $O_2$ (g) = $Fe_3O_4$ ($\beta$) (1,803°–1,874° K.) | −275,280 | −8.74 | +1.00 | −0.4 | +104.84 |
| $3Fe(l)$ + 2 $O_2$ (g) = $Fe_3O_4$ (l) (1,874°–2,000° K.) | −257,240 | −26.89 | +1.00 | −0.4 | +155.46 |
| HEMATITE | | | | | |
| $2Fe(\alpha)$ + 3/2 $O_2$ (g) = $Fe_2O_3$ ($\beta$) (298.16°–950° K.) | −200,000 | −13.84 | −1.45 | −1.905 | +108.26 |
| $2Fe(\alpha)$ + 3/2 $O_2$ (g) = $Fe_2O_3$ ($\beta$) (950°–1,033° K.) | −202,960 | −42.64 | +7.85 | −0.13 | +188.48 |
| $2Fe(\beta)$ + 3/2 $O_2$ (g) = $Fe_2O_3$ ($\beta$) (1,033°–1,050° K.) | −196,740 | −10.27 | +0.75 | −0.30 | +92.26 |
| $2Fe(\beta)$ + 3/2 $O_2$ (g) = $Fe_2O_3$ ($\gamma$) (1,050°–1,179° K.) | −193,200 | −0.39 | −0.13 | 0.30 | +59.96 |
| $2Fe(\gamma)$ + 3/2 $O_2$ (g) = $Fe_2O_3$ ($\gamma$) (1,179°–1,674° K.) | −202,540 | −25.95 | +2.87 | −0.30 | +142.85 |
| $2Fe(\delta)$ + 3/2 $O_2$ (g) = $Fe_2O_3$ ($\gamma$) (1,674°–1,800° K.) | −192,920 | −0.85 | −0.13 | −0.30 | +61.21 |
| MANGANESE | | | | | |
| $Mn(\alpha)$ + ½ $O_2$ (g) = $MnO$(c) (298.16°–1,000° K.) | −92,600 | −4.21 | +0.97 | +0.155 | +29.66 |

TABLE 1.2-continued

| Reaction and Temperature range of validity | $\Delta H_o$ | $2.303_a$ | b | c | I |
|---|---|---|---|---|---|
| $M_n(\beta) + \frac{1}{2} O_2 (g) = M_n O(c)$ (1,000°-1,374° K.) | −91,900 | +1.84 | −0.39 | +0.34 | +12.15 |
| $M_n(\gamma) + \frac{1}{2} O_2 (g) = M_n O(c)$ (1,374°-1,410° K.) | −89,810 | +7.30 | −0.72 | +0.34 | −6.05 |

TABLE 1.3

| Reaction and Temperature range of validity | $\Delta H_o$ | $2.303_a$ | b | c | I |
|---|---|---|---|---|---|
| MANGANESE | | | | | |
| $M_n(\delta) + \frac{1}{2} O_2 (g) = M_n O(c)$ (1,410°-1,517° K.) | −89,390 | +8.68 | −0.72 | +0.34 | −10.70 |
| $M_n(l) + \frac{1}{2} O_2 (g) = M_n O(c)$ (1,517°-2,000° K.) | −93,350 | +7.99 | −0.72 | +0.34 | −5.90 |
| $3M_n(\alpha) + 2 O_2 (g) = M_{n3}O_4 (\alpha)$ (298.16°-1,000° K.) | −332,400 | −7.41 | +0.66 | +0.145 | +106.62 |
| $3M_n(\beta) + 2 O_2 (g) = M_{n3}O_4 (\alpha)$ (1,000°-1,374° K.) | −330,310 | +10.75 | −3.42 | +0.70 | +54.07 |
| $3M_n(\gamma) + 2 O_2 (g) = M_{n3}O_4 (\alpha)$ (1,374°-1,410° K.) | −324,000 | +27.12 | −4.41 | +0.70 | −0.50 |
| $3M_n(\delta) + 2 O_2 (g) = M_{n3}O_4 (\alpha)$ (1,410°-1,445° K.) | −322,800 | +31.27 | −4.41 | +0.70 | −14.46 |
| $3M_n(\delta) + 2 O_2 (g) = M_{n3}O_4 (\beta)$ (1,445°-1,517° K.) | −328,870 | −4.56 | +1.00 | +0.40 | +95.20 |
| $3M_n(l) + 2 O_2 (g) = M_{n3}O_4 (\beta)$ (1,517°-1,800° K.) | −340,730 | −6.63 | +1.00 | −0.40 | +109.60 |
| $2M_n(\alpha) + 3/2 O_2 (g) = M_{n2}O_3 (c)$ (298.16°-1,000° K.) | −230,610 | −5.96 | −0.06 | +0.945 | +80.74 |
| $2M_n(\beta) + 3/2 O_2 (g) = M_{n2}O_3 (c)$ (1,000°-1,374° K.) | −229,210 | +6.15 | −2.78 | +0.315 | +45.70 |
| $2M_n(\gamma) + 3/2 O_2 (g) = M_{n2}O_3 (c)$ (1,374°-1,410° K.) | −255,030 | +17.06 | −3.44 | +1.315 | +9.33 |
| $2M_n(\delta) + 3/2 O_2 (g) = M_{n2}O_3 (c)$ (1,410°-1,517° K.) | −224,200 | +19.82 | −3.44 | +1.315 | +0.05 |
| $2M_n(l) + 3/2 O_2 (g) = M_{n2}O_3 (c)$ (1,517°-1,700° K.) | −232,110 | +18.44 | −3.44 | +1.315 | +9.65 |
| $M_n(\alpha) + O_2 (g) = M_n O_2 (c)$ (298.16°-1,000° K.) | −126,400 | −8.61 | +0.97 | +1.555 | +70.14 |

TABLE 1.4

THERMODYNAMIC PROPERTIES - SELECTED ELEMENTS AND OXIDES

Reference: U.S. Atomic Energy Commission Report: ANL-5750

A. The first column lists the elements or oxides, the second column gives the phase to which the data are applicable. The third, fourth and fifth columns specify the thermodynamic properties for the transition to the next succeeding phase. In column six, the value of the entropy at 298.16° K., the reference temperature is given. The remaining columns except for the last one give the values of the constants a, b, c, d, A, and B, required in thermodynamic equation.

B. All values throughout the table which represent estimates have been enclosed in parentheses.

C. The heat capacities at temperatures beyond the range of experimental determination were estimated by extrapolation.

| Element or Oxide | Phase | Temperature of transition (°K.) | Heat of transition Kcal/mole | Entropy transition (e.u.) | Entropy 298° K. (e.u.) | a | b | c | d | A Kcal/mole | B Kcal/mole |
|---|---|---|---|---|---|---|---|---|---|---|---|
| $H_2O(g)$ | gas | | | | 45.11 | 11.2 | 7.17 | | | (3.658) | (53.5) |
| $H_2O(l)$ | liquid | 373.16 | 9.770 | 26.18 | 16.716 | 8.2 | (0.4) | | (0.2) | (49.67) | (20.2) |
| $F_e(s)$ | solid α | 1,033 | 0.41 | 0.397 | 6.491 | 3.37 | 7.10 | | 0.43 | 1.176 | 14.59 |
| $F_e(s)$ | solid β | 1,180 | 0.217 | 0.184 | | 10.40 | | | | 4.281 | 55.66 |
| $F_e(s)$ | solid γ | 1,673 | 0.15 | 0.084 | | 4.85 | 3.00 | | | 0.396 | 19.76 |
| $F_e(s)$ | solid δ | 1,808 | 3.86 | 2.14 | | 10.30 | | | | 4.382 | 55.11 |
| $F_eO(s)$ | solid | 1,641 | 7.5 | 4.6 | 12.9 | 9.27 | 4.80 | | | (2.977) | (43.8) |
| $F_{e3}O_4(s)$ | solid | 900 | | | 35.0 | 12.38 | 1.62 | | −0.38 | (3.826) | (58.3) |
| $F_{e2}O_3(s)$ | solid α | 950 | 0.16 | 0.17 | 21.5 | | | | | | |

TABLE 1.5

| Element or Oxide | Phase | Temperature of transition (°K.) | Heat of transition Kcal/mole | Entropy transition (e.u.) | Entropy 298° K. (e.u.) | a | b | c | d | A Kcal/mole | B Kcal/mole |
|---|---|---|---|---|---|---|---|---|---|---|---|
| $F_{e2}O_3(s)$ | solid β | 1,050 | | | | 21.88 | 48.20 | | | 8.666 | (104.0) |
| $M_n(s)$ | solid α | 1,000 | 0.535 | 0.535 | 7.59 | 5.70 | 3.38 | | −0.37 | 1.974 | 26.11 |
| $M_n(s)$ | solid β | 1,374 | 0.545 | 0.397 | | 8.33 | 0.66 | | | 2.672 | 41.02 |
| $M_n(s)$ | solid γ | 1,410 | 0.430 | 0.305 | | 10.70 | | | | 4.76 | 56.84 |
| $M_n(s)$ | solid δ | 1,517 | 3.5 | 2.31 | | 11.30 | | | | 5.176 | 60.88 |
| $M_nO(s)$ | solid | 2,058 | 13.0 | 6.32 | 14.27 | 11.11 | 1.94 | | −0.88 | 3.689 | 50.10 |
| $M_{n3}O_4(s)$ | solid α | 1,445 | 4.97 | 3.44 | 35.5 | 34.64 | 10.82 | | −2.20 | 11.312 | 166.30 |
| $M_{n3}O_4(s)$ | solid β | 1,863 | (33) | (18) | | 50.20 | | | | 17.376 | 260.40 |
| $M_{n2}O_3(s)$ | solid | decomposes 1,620 | | | 26.4 | 24.73 | 8.38 | | −3.23 | 8.829 | 118.80 |
| $M_nO_2(s)$ | solid | decomposes 1,120 | | | 12.7 | 16.60 | 2.44 | | −3.88 | 6.359 | 84.80 |

TABLE 1.6

VALUES OF CHEMICAL THERMODYANMIC PROPERTIES

Reference: National Bureau of Standards 500 - Selected Values, Chemical, Thermodynamic Properties.

| Substance | State | $\Delta H^\circ_{form}$ | $\Delta G^\circ_{form}$ | S° |
|---|---|---|---|---|
| $F_e$ | g | 96.68 | 85.76 | 43.11 |
| $F_eO$ | s | −63.7 | −58.4 | 12.9 |
| $F_{e2}O_3$ | s | −196.5 | −177.1 | 21.5 |
| $F_{e3}O_4$ | s | −267.0 | −242.4 | 35.0 |
| $M_n$ | g | 68.34 | 58.23 | 41.49 |
| $M_nO$ | s | −92.0 | −86.8 | 14.4 |
| $M_nO_2$ | s | −124.5 | −111.4 | 12.7 |
| $M_{n2}O_3$ | s | −232.1 | | |
| $M_{n3}O_4$ | S | −331.4 | −306.0 | 35.5 |
| $H_2O$ | g | −57.80 | −54.64 | 45.11 |
| $H_2O$ | l | −68.32 | −56.69 | 16.72 |

Note:
All values in Kcals per gram mole

TABLE 1.7

PHYSICAL CONSTANTS

Reference: Bureau of Mines Bulletin 592

| Element or Oxide | Molecular weight | Density (sp. gravity) | Melting Point (°C.) | Boiling Point (°C.) | Specific Heat (25° C. Cp = cal/g |
|---|---|---|---|---|---|
| $F_e$ | 55.847 | 7.86 | 1,535.0 | 3,000 | 0.106 |
| $F_{e2}O_3$ | 159.69 | 5.24 | 1,565.0 | | |
| $F_eO$ | 71.85 | 5.7 | 1,420.0 | | |
| $M_n$ | 54.938 | 7.2 | 1,244.0 | 2,097 | 0.114 |
| $M_nO$ | 70.94 | 5.44 | | | |
| $M_{n2}O_3$ | 157.87 | 4.5 | (−0) 1,080 | | |
| $M_{n3}O_4$ | 228.81 | 4.856 | 1,705 | | |
| $M_nO_2$ | 86.94 | 5.026 | (−0) 535 | | |

TABLE 2.1

Interconversion of measures of Hydrogren Content

| | H/Pd x | Relative volumes x | mgH₂/100 g x | ccH₂/gPd x |
|---|---|---|---|---|
| H/Pd | — | ≈7.9 × 10⁻⁴ | 1.06 × 10⁻³ | ≈9.5 × 10⁻³ |
| Relative volumes (ccH₂/ccPd) | ≈1.25 × 10³ | — | ≈1.33 | ≈12.0 |
| mgH₂/100 gPd | ≈9.40 × 10² | ≈7.5 × 10⁻¹ | — | ≈8.9 |
| ccH₂/gPd | ≈1.05 × 10² | ≈8.3 × 10⁻² | ≈1.11 × 10⁻¹ | — |

TABLE 2.2

Sub-groupings of the transition elements

| 3 | 4 | 5 | 6 | 7 | 8 | | | 1 | 2 |
|---|---|---|---|---|---|---|---|---|---|
| Sc | | Ti | V | Cr | Mn | Fe | Co | Ni | Cu | Zn |
| Y | | Zr | Nb | Mo | Tc | Ru | Rh | Pd | Ag | Cd |
| La | Rare earths | Hf | Ta | W | Re | Os | Ir | Pt | Au | Hg |

TABLE 2.3

Some properties of the platinum metals

| | Ruthenium | Rhodium | Palladium | Osmium | Iridium | Platinum |
|---|---|---|---|---|---|---|
| Atomic number | 44 | 45 | 46 | 76 | 77 | 78 |
| Atomic weight | 101.07 | 102.9 | 106.4 | 190.2 | 192.2 | 195.1 |
| Crystal structure | h.c.p. | f.c.c. | f.c.c. | h.c.p. | f.c.c. | f.c.c. |
| Lattice constant at 20° C.— kx units (1 kx = 1.00202 A) | — | 3.7963 | 3.8829 | — | 3.8317 | 3.9152 |
| Density at 20° C. g/cm³ | 12.45 | 12.41 | 12.02 | 22.61 | 22.65 | 21.45 |
| Melting point (°C.) | 2310 | 1960 | 1552 | 3050 | 2443 | 1769 |
| Boiling point (°C.) | 4100 | 3700 | 2900 | 5000 | 4500 | 3800 |
| Electrical resistivity at 0° C. (micro-ohm/cm) | 6.80 | 4.33 | 9.93 | 8.12 | 4.17 | 9.85 |
| Temperature coefficient of electrical resistance (0-100° C.) per °C. | 0.0042 | 0.0046 | 0.0038 | 0.0042 | 0.0043 | 0.0039 |
| Magnetic susceptibility at 18° C. (c.g.s. units × 10⁻⁶) | 0.50 | 1.11 | 5.4 | 0.05 | 0.15 | 1.10 |
| Young's Modulus lb/in² × 10⁻⁶ | 60 | 46.2 | 16.7 | 81 | 75 | 24.8 |
| Hardness (DPN) for annealed specimens | 250-450 | 120 | 37-40 | 330-760 | 200-240 | 37-42 |

I claim:

1. A method of deriving hydrogen from superheated steam, comprising:

passing the superheated steam into a reaction chamber in which it is exposed to a pair of chamber walls;

a first chamber wall of said pair being comprised of a reactant capable of reacting exothermally with superheated steam to liberate free hydrogen and to produce an oxidized compound which is dissociable to release oxygen when heated at or above a dissociation temperature;

the second chamber wall of said pair being comprised of a material which is permeable to hydrogen but relatively impermeable to steam and oxygen;

heating said first chamber wall by applying heat to its face remote from the reaction chamber in a reducing atmosphere at or above said dissociation temperature whereby said face is maintained at a higher temperature than the face exposed to the superheated steam within the chamber and oxygen is taken away from said remote face by the reducing atmosphere such that said reactant reacts exothermally with the superheated steam in the chamber to liberate free hydrogen within the chamber and to produce said oxidized compound which compound dissociates so as to continuously regenerate the reactant; and withdrawing free hydrogen from said chamber by diffusion through said second chamber wall.

2. A method as claimed in claim 1, wherein the heat is applied to the first chamber wall by subjecting its face remote from the reaction chamber to burning hydrogen.

3. A method as claimed in claim 2, wherein residual steam and gas is drawn from the reaction chamber and passed across the face of the first chamber wall remote from the reaction chamber together with the burning hydrogen and thence to an exhaust.

4. A method as claimed in claim 1, wherein said material of the said second chamber wall is such as to partially decompose the superheated steam to enhance the liberation and extraction of free hydrogen.

5. A method as claimed in claim 4, wherein said material comprises a metal in Group 8 of the Periodic Classification of Elements.

6. A method as claimed in claim 5, wherein the said metal is palladium.

7. A method as claimed in claim 1, wherein said reactant comprises a major proportion of iron.

8. A method as claimed in claim 7, wherein said reactant comprises an iron-manganese alloy.

9. Apparatus for deriving hydrogen from superheated steam, comprising:
- a chamber structure defining a flow-through reaction chamber having an inlet and an outlet and including a pair of chamber boundary walls;
- a first chamber wall of said pair comprising a reactant capable of reacting exothermally with superheated steam to liberate free hydrogen and to produce an oxidized compound which is dissociable to release oxygen when heated to or above a dissociation temperature, wherein the face of the first chamber wall remote from the reaction chamber is exposed to a deoxidation chamber;
- the second chamber wall of said pair being comprised of a material which is permeable to hydrogen but relatively impermeable to steam and oxygen;
- steam inlet means to direct the superheated steam into said chamber through the chamber inlet; and
- heating means comprising a hydrogen burner to burn hydrogen within the deoxidation chamber to heat said face of the first chamber wall in a reducing atmosphere at or above said dissociation temperature thereby continuously regenerating said reactant by dissociation of the oxidized compound formed by the reaction with the superheated steam.

10. Apparatus as claimed in claim 9, wherein the hydrogen burner is connected to a hydrogen supply tank to be replenished by hydrogen extracted from the reaction chamber by the hydrogen extraction means.

11. Apparatus as claimed in claim 9, wherein the deoxidation chamber is a flow-through chamber connected upstream to the outlet of the reaction chamber and downstream to an exhaust.

12. Apparatus as claimed in claim 9, wherein said material of the second chamber wall of the reaction chamber is capable of partially decomposing the superheated steam to enhance the liberation and extraction of free hydrogen.

13. Apparatus as claimed in claim 12, wherein said material is comprised of a metal in Group 8 of the Periodic Classification of Elements.

14. Apparatus as claimed in claim 12, wherein said metal is palladium.

15. Apparatus as claimed in claim 12, wherein said metal is palladium and is contained in a palladium-silver alloy.

16. Apparatus as claimed in claim 9, wherein said reactant is comprised in a major proportion of iron.

17. Apparatus as claimed in claim 16, wherein said reactant comprises an iron-manganese alloy.

18. Apparatus for deriving hydrogen from superheated steam, comprising:
- a chamber structure defining a flow-through reaction chamber having an inlet and an outlet and including a pair of chamber boundary walls;
- a first chamber wall of said pair being comprised of a reactant capable of reacting exothermally with superheated steam to liberate free hydrogen and to produce an oxidized compound which is dissociable to release oxygen when heated to or above a dissociation temperature;
- the second chamber wall of said pair being comprised of a membrane of palladium-silver alloy of less than 0.01 inches wall thickness, said membrane covered over a portion of its surface area exposed to the reaction chamber with a layer of copper approximately 0.0005 inches thick;
- said first and second walls formed as concentric tubes between which there is an annular gap constituting said reaction chamber;
- steam inlet means to direct the superheated steam into said chamber through the chamber inlet;
- heating means to heat the first chamber wall; and
- hydrogen extraction means to extract hydrogen from the chamber by diffusion through said second chamber wall.

19. Apparatus as claimed in claim 18, wherein said first chamber wall is defined by the outermost tube and is comprised in a major proportion of iron and said second chamber wall is defined by the innermost tube and is comprised of palladium.

* * * * *